(12) United States Patent
Yamashita et al.

(10) Patent No.: US 8,546,466 B2
(45) Date of Patent: Oct. 1, 2013

(54) IMAGE RECORDING COMPOSITION, INK SET FOR IMAGE RECORDING, RECORDING APPARATUS, AND IMAGE RECORDING METHOD

(75) Inventors: Yoshiro Yamashita, Kanagawa (JP); Ken Hashimoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1004 days.

(21) Appl. No.: 12/356,616

(22) Filed: Jan. 21, 2009

(65) Prior Publication Data

US 2010/0080907 A1    Apr. 1, 2010

(30) Foreign Application Priority Data

Sep. 26, 2008 (JP) ................................. 2008-248981

(51) Int. Cl.
*C09D 11/00* (2006.01)

(52) U.S. Cl.
USPC ..... 523/160; 427/256; 106/31.13; 106/31.92; 118/620

(58) Field of Classification Search
USPC ................................................ 523/160, 161
See application file for complete search history.

(56) References Cited

U.S. PATENT DOCUMENTS

| | | | |
|---|---|---|---|
| 5,989,650 A * | 11/1999 | Inamoto et al. | 427/487 |
| 6,257,716 B1 | 7/2001 | Yanagawa et al. | |
| 6,610,388 B2 * | 8/2003 | Xing et al. | 428/195.1 |
| 7,052,535 B2 * | 5/2006 | Uhlir-Tsang et al. | 106/31.27 |
| 2002/0198289 A1 * | 12/2002 | Gummeson | 523/400 |
| 2004/0105995 A1 | 6/2004 | Yuasa | |
| 2005/0110856 A1 | 5/2005 | Mouri et al. | |
| 2006/0137574 A1 * | 6/2006 | Preston et al. | 106/464 |
| 2007/0176995 A1 | 8/2007 | Kadomatsu et al. | |
| 2008/0018695 A1 | 1/2008 | Kadomatsu et al. | |
| 2008/0062241 A1 * | 3/2008 | Yamashita et al. | 347/224 |
| 2009/0175663 A1 | 7/2009 | Taniuchi et al. | |

FOREIGN PATENT DOCUMENTS

| | | |
|---|---|---|
| JP | 5-229112 | 9/1993 |
| JP | 08-150707 | 6/1996 |
| JP | 10-203005 | 8/1998 |
| JP | 2001-212956 | 8/2001 |
| JP | 2001-348519 | 12/2001 |
| JP | 2002-293807 | 10/2002 |
| JP | 2005-048347 | 2/2005 |
| JP | 2005-170036 | 6/2005 |
| JP | 2005-231048 | 9/2005 |
| JP | 2007-230232 | 9/2007 |
| JP | 2008-012919 | 1/2008 |
| JP | 2008-023904 | 2/2008 |
| JP | 2008-115346 | 5/2008 |
| JP | 2001-115067 | 4/2011 |

OTHER PUBLICATIONS

Chinese Office Action dated Nov. 30, 2011.
English translation of Chinese Office Action dated Nov. 30, 2011.
Japanese Office Action dated Dec. 18, 2012.
English translation of Japanese Office Action dated Dec. 18, 2012.

* cited by examiner

*Primary Examiner* — Doris Lee
(74) *Attorney, Agent, or Firm* — Fildes & Outland, P.C.

(57) ABSTRACT

According to the invention, there is provided an image recording composition comprising a curable material capable of immobilizing a colorant material in a received ink and curable by an external stimulus.

20 Claims, 4 Drawing Sheets

IMAGE RECORDING COMPOSITION, INK SET FOR IMAGE RECORDING, RECORDING APPARATUS, AND IMAGE RECORDING METHOD

CROSS-REFERENCE TO RELATED APPLICATIONS

This application is based on and claims priority under 35 USC 119 from Japanese Patent Application No. 2008-248981 filed on Sep. 26, 2008.

BACKGROUND

1. Technical Field

The present invention relates to an image recording composition, an ink set for image recording, a recording apparatus, and an image recording method.

2. Related Art

In recording methods using an ink, an image is recorded on various recording media, such as permeable media and impermeable media, and methods have been proposed which involve recording an image on an intermediate transfer member, and then transferring the recorded image to a recording medium.

SUMMARY

According to an aspect of the invention, there is provided an image recording composition comprising a curable material capable of immobilizing a colorant material in a received ink and curable by an external stimulus.

According to an aspect of the invention, there is provided an image recording ink set comprising an image recording composition containing an ink and a curable material capable of immobilizing a colorant material in the ink and curable by an external stimulus.

According to an aspect of the invention, there is provided a recording apparatus, comprising: an intermediate transfer member, a supply unit that supplies, to the intermediate transfer member, an image recording composition containing a curable material that receives an ink, immobilizes a colorant material in the ink, and that is cured by an external stimulus, a ejecting unit that ejects the ink to a curable layer formed by supplying the image recording composition to the intermediate transfer member, a transfer unit that transfers the curable layer to which the ink has been ejected, from the intermediate transfer member to a recording medium, and a stimulus application unit that applies a stimulus that cures the curable layer.

According to an aspect of the invention, there is provided a recording apparatus, comprising:

a supply unit that supplies, to a recording medium, an image recording composition containing a curable material that receives an ink, immobilizes a colorant material in the ink, and that is cured by an external stimulus, a ejecting unit that ejects the ink to a curable layer formed by supplying the image recording composition to the recording medium, and a stimulus application unit that applies a stimulus that cures the curable layer.

According to an aspect of the invention, there is provided an image recording method, comprising:

supplying, to an intermediate transfer member, an image recording composition containing a curable material that receives an ink, immobilizes a colorant material in the ink, and that is cured by an external stimulus, ejecting the ink to a curable layer formed by supplying the image recording composition to the intermediate transfer member, transferring the curable layer to which the ink has been ejected, from the intermediate transfer member to a recording medium, and applying a stimulus that cures the curable layer.

BRIEF DESCRIPTION OF THE DRAWINGS

Exemplary embodiments of the present invention will be described in detail based on the following figures, wherein.

DETAILED DESCRIPTION

Figure 1:
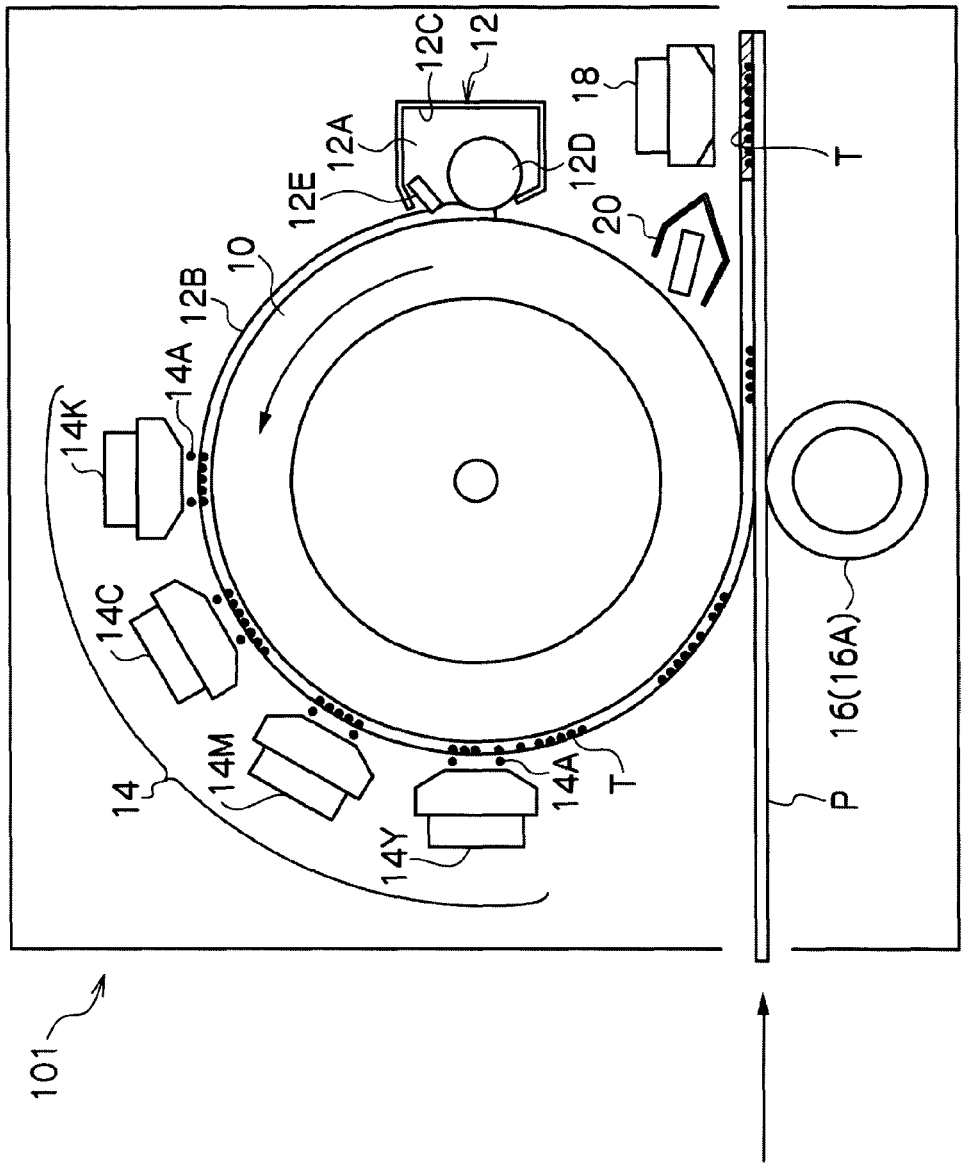
FIG. 1 is a configuration diagram illustrating a recording apparatus according to a first exemplary embodiment.

Hereinafter, exemplary embodiments of the present invention will be described in detail.

<Image Recording Composition and Ink>

An image recording composition according to this exemplary embodiment contains a curable material which receives an ink, has a function of immobilizing a colorant material in the ink, and is cured by an external stimulus.

It should be noted that the above phrase "function of immobilizing a colorant material in the ink" refers to a function of reducing at least one of solubility, dispersibility, or fluidity of a colorant material of an ink in a solvent and in a curable material by an interaction with the colorant material in the ink to thereby suppress diffusion of the colorant material.

Here, a method of confirming whether a curable material has the "function of immobilizing a colorant material in an ink" is carried out as follows.

First, a mixture in which a solution of a colorant material or a dispersion liquid has been mixed with a target curable material is prepared.

(1) It is confirmed whether, by filtering the mixture through a filter having a pore diameter through which the solution or dispersion liquid of a colorant material can pass, the colorant material can pass through the filter. When the colorant material cannot pass, it is determined that solubility and dispersibility of the colorant material decrease. Thus, it is determined that the curable material has the "function of immobilizing the colorant material in the ink".

(2) The viscosity of the mixture is measured. Then, when the viscosity of the mixture is higher than the viscosity of each of the solution or dispersion liquid of the colorant material and the curable material, it is determined that the fluidity decreases and that the curable material has the "function of immobilizing the colorant material in the ink".

As described above, when it is judged in either one of the methods (1) and (2) above that the curable material has the "function of immobilizing the colorant material in the ink", the curable material is recognized to have the "function of immobilizing the colorant material in the ink".

The image recording composition according to this exemplary embodiment is supplied to an intermediate transfer member or a recording medium by a recording apparatus to form a curable layer, and an ink is ejected to the curable layer.

More specifically, the image recording composition according to this exemplary embodiment is supplied to an intermediate transfer member or a recording medium to form a curable layer, and then an ink is ejected to the curable layer. During this process, the colorant material in the ink is immobilized by the function of immobilizing the colorant material in the ink of the curable material, and at least one of solubility, dispersibility, and fluidity decreases. Thus, it is presumed that diffusion of the colorant material of the ink in the solvent and in the curable material is suppressed, blur is suppressed, and, as a result, a high definition image with less blur is formed.

Moreover, since the image recording composition according to this exemplary embodiment contains a curable material having a function of immobilizing a colorant material in an ink, there is no need to add conventional liquid absorbing particles, or the required addition amount of liquid absorbing particles can be reduced to a minimum. Therefore, reduction in storage stability caused by precipitation of the liquid absorbing particles in the image recording composition, thickening or gelling of the liquid absorbing particles due to, for example, moisture absorption, is effectively suppressed.

[Water-Soluble Curable Material]

Moreover, it is preferable that the curable material contained in the image recording composition according to this exemplary embodiment be water soluble. The curable material is regarded as water soluble if, when 10% by weight of the image recording composition is mixed with water, a solution is formed in which the image recording composition and water are mixed without dissociating.

If the curable material is water soluble, the ejected ink is efficiently absorbed without being repelled from a curable layer formed from the image recording composition, and favorably permeates into the curable layer.

Examples of methods of rendering the curable material in this exemplary embodiment water soluble include a method involving introducing a functional group which causes a curing reaction into a compound having a water-soluble skeleton or a method involving denaturalizing a curable material with a substance having a functional group having compatibility with water.

[Methods of Immobilizing Colorant Material in Ink]

Methods with respect to the function of the curable material in this exemplary embodiment of immobilizing a colorant material in ink are described below in detail. Although these methods are not limited to this exemplary embodiment, the following methods (1) to (3) are disclosed as examples.

<First method> Providing a curable material with an electrolyte structure.
<Second method> Providing a curable material with a functional group having a polarity opposite to the polarity of a colorant material and/or a dispersant contained in an ink.
<Third method> Providing a curable material with a pH lower than the pH of an ink.

Each of the above first to third specific methods are described below.

<First Method>
When a Curable Material has an Electrolyte Structure:

If a curable material contained in an image recording composition according to the present exemplary embodiment has an electrolyte structure, a colorant material in an ink ejected to a curable layer formed of the curable material is immobilized.

Although the mechanism of this effect is not exactly clear, it thought to occur as follows. When a curable material has an electrolyte structure, an electrical repelling force between a colorant material and another colorant material is reduced, and, as a result, the colorant material is condensed and immobilized.

Curable Material Having an Electrolyte Structure

The "electrolyte structure" of the curable material refers to a structure in which the curable material is dissociated with a solvent, such as water, and is electrically charged.

A specific example of the electrolyte structure includes a metal salt structure.

Moreover, "curing properties" in the curable material having an electrolyte structure according to the first method refer to properties with which the curable material is cured by an external stimulus, such as ultraviolet light, an electron beam, or heat. It should be noted that the stimulus from the outside which cures the curable material is not limited thereto, and, for example, moisture, oxygen, etc., can be applied.

Any curable material having an electrolyte structure may be used insofar as the curable material is cured by an external stimulus, such as ultraviolet light, an electron beam, or heat (e.g., cured with the progress of a polymerization reaction). Among the curable materials, a material having a high curing rate (e.g., a material having a high polymerization reaction rate) is preferable considering an increase in an image recording rate. Examples of the curable material include radiation curable materials (e.g., the above-mentioned ultraviolet curable material and the electron beam curable material).

Specific examples of the curable material having an electrolyte structure according to the first method include high-electrolyte curable materials, such as metal mono-(meth)acrylate, metal di(meth)acrylate, and metal tri(meth)acrylate. More specifically, zinc-modified acrylate and the like are mentioned.

(It should be noted that each specific example mentioned above is a curable material which is cured by irradiation with radiation).

It should be noted that, as the content of an electrolyte structure per unit molecular weight in the curable material according to the first method, the number of functional groups is preferably from 1 to 5, more preferably 1 to 4, and particularly preferably from 1 to 3.

The content of an electrolyte structure per unit molecular weight in the curable material is a value measured as follows. Numerical values indicated in this specification are measured by the following method.

When the molecular structural formula is known, the number of functional groups corresponding to an electrolyte in the structural formula may be simply counted. In contrast, when the molecular structural formula is unknown, the curable material is isolated, the structural formula is determined by chemical analysis, and the number of functional groups corresponding to an electrolyte is calculated.

The curable material may be modified with Si, fluorine, etc. The curable material may contain a polyfunctional prepolymer.

The content of the curable material having the above-mentioned electrolyte structure in the image recording composition according to the first method is preferably from 50% by weight to 100% by weight, for example.

Examples of a combination of the curable material in the first method and an ink mentioned later include a combination of acrylate having a metal salt structure and an anionic ink.

Polymerization Initiator

It is preferable for the image recording composition according to the first method to contain a polymerization initiator for progressing a curing reaction by an external stimulus, such as radiation (ultraviolet light, electron beam) or heat. Moreover, the image recording composition may contain, as required, a reaction auxiliary agent or a polymerization promoter for progressing a polymerization reaction.

When a curing reaction by irradiation with radiation progresses by a radical reaction, examples of a radiation polymerization initiator include benzophenone, a thioxanthone-based radiation polymerization initiator, benzyl dimethyl ketal, α-hydroxyketone, α-hydroxyalkyl phenone, α-aminoketone, α-amino alkyl phenone, monoacyl phosphine oxide, bisacyl phosphine oxide, hydroxybenzophenone, aminobenzophenone, a titanocene-based radiation polymerization initiator, an oxime ester-based radiation polymerization initiator, an oxyphenylacetic acid ester-based radiation polymerization initiator.

Moreover, when a curing reaction by irradiation with radiation progresses by a cationic reaction, examples of a radiation polymerization initiator include arylsulfonium salts, aryldiazonium salts, diaryliodonium salts, triarylsulfonium salts, allene-ion complex derivatives, and triazine initiators.

Furthermore, examples of a thermal polymerization initiator include acids, such as proton acid/Lewis acid, alkaline catalysts, and metal catalysts.

Liquid Absorbing Particles

As described above, to the image recording composition according to the first method, there is no need to add liquid absorbing particles, or the required addition amount of liquid absorbing particles can be reduced to a minimum. More specifically, it is particularly preferable to contain no liquid absorbing particles from the viewpoint of obtaining a storage stability effect. It should be noted that, to the above-mentioned image recording composition, liquid absorbing particles may be added.

Next, the liquid absorbing particles will be described.

Any liquid absorbing particles may be employed insofar as the liquid absorbing particles absorb an aqueous solvent.

Here, "absorbing an aqueous solvent" means that the liquid absorption amount is 100 ml/100 g or more. The "liquid absorption amount" refers to the amount (ml) of liquid to be absorbed by 100 g of an absorbing material, and is measured as follows.

Specifically, liquid absorbing particles are gently left to stand in a water layer, a water absorption sample is pulled after water permeates throughout sample, the water absorption sample is allowed to stand for 5 minutes on a mesh, and the weight is measured. Thus, a difference from the liquid absorbing particles is defined as a liquid absorption amount. Moreover, a method according to JIS K5101-13-1 may be employed.

The liquid absorption amount of the liquid absorbing particles relative to an aqueous solvent is preferably adjusted to 200 ml/100 g or more, for example.

The particle diameter (volume average particle diameter) of liquid absorbing particles is adjusted in the range of from 0.5 μm to 5 μm, for example.

Specific examples of liquid absorbing particles include copolymers composed of polyacrylic acid and salts thereof, polymethacrylic acid and salts thereof, (meth)acrylic acid ester-(meth)acrylic acid and salts thereof; copolymers composed of styrene-(meth)acrylic acid and salts thereof, copolymers composed of styrene-(meth)acrylic acid ester-(meth)acrylic acid and salts thereof, copolymers composed of styrene-(meth)acrylic acid ester-ester generated from alcohol having an aliphatic or aromatic substituent having carboxylic acid and the salt structure thereof and (meth)acrylic acid; copolymers composed of (meth)acrylic-acid ester and ester generated from alcohol having an aliphatic or aromatic substituent having carboxylic acid and the salt structure thereof and (meth)acrylic acid; ethylene-(meth)acrylic acid copolymers; copolymers composed of butadiene-(meth)acrylic acid ester-(meth)acrylic acid and salts thereof, copolymers composed of butadiene-(meth)acrylic acid ester-ester generated from alcohol having an aliphatic or aromatic substituent having carboxylic acid and the salt structure thereof and (meth)acrylic acid, copolymers composed of polymaleic acid and salts thereof, styrene and maleic acid and salts thereof, sulfonic acid modified substances of each of the above-mentioned resins; and phosphoric acid modified substances of each of the above-mentioned resins. Preferably, copolymers composed of polyacrylic acid and salts thereof and styrene-(meth)acrylic acid and salts thereof; copolymers composed of styrene-(meth)acrylic acid ester-(meth)acrylic acid and salts thereof; copolymers composed of styrene-(meth)acrylic acid ester-ester generated from alcohol having an aliphatic or aromatic substituent having carboxylic acid and the salt structure thereof and (meth)acrylic acid; copolymers composed of (meth)acrylic acid ester-(meth)acrylic acid and salts thereof are mentioned. These resins may be crosslinked or not crosslinked.

These liquid absorbing particles are produced by suspension polymerization, emulsion polymerization, solution polymerization, etc., and may be used in the form as they are, pulverized with a ball mill or a sand mill or freeze pulverized, or subjected to reprecipitation by a solvent or the like.

The content of the liquid absorbing particles in the whole image recording composition is adjusted in range of from 0% by weight to 15% by weight, for example.

Another Immobilizing Component

Moreover, the image recording composition according to the first method may contain, in addition to the curable material and liquid absorbing particles, another component for immobilizing (hereinafter sometimes referred to as "another immobilizing component") an ink component on or in a curable layer. It should be noted that it is particularly preferable to contain no another immobilizing component, similarly as in the case of the liquid absorbing particles, from the viewpoint of obtaining a storage stability effect.

In the first method, when the image recording composition contains the liquid absorbing particles or another immobilizing component, the liquid absorbing particles or another immobilizing component are mixed therein beforehand. The liquid absorbing particles or another immobilizing component may be blended in a curable layer, by, for example, separately preparing a solution containing the liquid absorbing particles and another immobilizing component, and ejecting the solution to the curable layer formed of the image recording composition by a measure for ejecting the solution. The process of ejecting the solution containing the liquid absorbing particles and another immobilizing component to a curable layer is preferably performed before an ink is ejected to the curable layer.

Examples of another immobilizing component include, but not limited thereto, components adsorbing ink components (e.g., colorant material) and components condensing or thickening ink components (e.g., colorant material).

Examples of components adsorbing ink components (e.g., colorant material) include silica, alumina, and zeolite. The proportion of the component is, for example, in the range of from 0% by weight to 5% by weight.

Examples of a component condensing or thickening ink components (e.g., colorant material) include coagulants, such as inorganic electrolyte, organic acid, inorganic acid, and organic amine.

The coagulants may be used singly or as a mixture of two or more thereof. The content of the coagulant is, for example, in the range of from 0% by weight to 5% by weight.

Moreover, the image recording composition may contain water or an organic solvent for dissolving or dispersing main components (a curable material, a polymerization initiator, etc.) which contribute to the above-mentioned curing reaction.

Moreover, the image recording composition may contain various colorant materials for the purpose of controlling coloring of a layer after curing.

Moreover, it is preferable for the image recording composition to contain a thermoplastic resin for the purpose of adjusting the viscosity. Examples of the thermoplastic resin include acrylic resin, polyester resin, polycarbonate resin, polyurethane resin, polystyrene, polyether resin, polyethylene resin, polypropylene resin, copolymers of styrene and acrylic monomer, and blends thereof.

It should be noted that the viscosity of the image recording composition is, for example, in the range of from 5 mPa·s to 30,000 mPa·s. Moreover, the viscosity of the image recording composition is preferably higher than the viscosity of an ink.

The viscosity is a value measured by the following method, and the viscosity indicated in this specification is a value measured by the following method.

The viscosity (mPa·s) at 15° C. is measured using TV-22 (manufactured by Toki Sangyo Co., Ltd.) as a viscometer at a rate of shear of from 2.25 to 750 (s$^{-1}$). In this specification, the viscosity is indicated in terms of a rate of shear of 10 s$^{-1}$.

The image recording composition may be of low volatility or non-volatility at normal temperature (25° C.). Here, the low volatility means that the boiling point is 200° C. or higher under the atmospheric pressure. The nonvolatility means that the boiling point is 300° C. or more under the atmospheric pressure.

Ink

Subsequently, an ink used in the first method will be described in detail.

As the ink, both of water-based inks and oil-based inks can be used and water-based inks are used in view of the environment. Water-based inks (hereinafter simply referred to as an ink) contain an ink solvent (e.g., water and a water-soluble organic solvent) in addition to a recording material. Moreover, additives may be contained therein as required.

As the recording material, a coloring material is typically used. Although both dyes and pigments are usable, pigments are preferred. Both organic pigments and inorganic pigments can be used as the pigment, and black pigments include carbon black pigments such as furnace black, lamp black, acetylene black, channel black, and the like. Other than pigments of black and three primary colors of cyan, magenta and yellow, pigments of a specific color such as red, green, blue, brown and white, pigments having a metallic luster such as gold and silver, extender pigments having no color or a pale color, may be used. Pigments that are newly synthesized for the present exemplary embodiment may also be used.

Further, particles formed by adhering a dye or a pigment to the surface of a core formed from silica, alumina, or polymer beads, insoluble laked products of a dye, a colored emulsion, a colored latex or the like may also be used as the pigment.

Specific examples of black pigments include RAVEN 7000 (trade names; manufactured by Columbian Carbon); REGAL 400R (trade names; manufactured by Cabot Corporation); COLOR BLACK FW1 (trade names; manufactured by Degussa), but are not limited thereto.

Specific examples of cyan color pigments include C. I. PIGMENT BLUE-1, -2, -3, -15, -15:1, -15:2, -15:3, -15:4, -16, -22 and -60, but are not limited thereto.

Specific examples of magenta color pigments include C. I. PIGMENT RED-5, -7, -12, -48, -48:1, -57, -112, -122, -123, -146, -168, -177, -184, -202, and C. I. PIGMENT VIOLET-19, but are not limited thereto.

Specific examples of yellow color pigments include C. I. PIGMENT YELLOW-1, -2, -3, -12, -13, -14, -16, -17, -73, -74, -75, -83, -93, -95, -97, -98, -114, -128, -129, -138, -151, -154 and -180, but are not limited thereto.

When a pigment is used as the coloring material, it is desirable to use a dispersing agent in combination. The dispersing agents that can be used in the invention include a polymeric dispersant, an anionic surfactant, a cationic surfactant, an amphoteric surfactant, and a nonionic surfactant.

As the polymeric dispersant, polymers having both a hydrophilic structural moiety and a hydrophobic structural moiety are suitably used. The polymer having both a hydrophilic structural moiety and a hydrophobic structural moiety may be either a condensation-type polymer or an addition-type polymer. The condensation-type polymers include known polyester-type dispersants. The addition-type polymers include an addition polymer of a monomer having an α,β-ethylenic unsaturated group. The desired polymeric dispersant may be obtained by copolymerizing a monomer having an α,β-ethylenic unsaturated group and a hydrophilic group with a monomer having an α,β-ethylenic unsaturated group and a hydrophobic group. Moreover, a homopolymer of a monomer having a hydrophilic group and an α,β-ethylenic unsaturated group may also be used.

Monomers having an α,β-ethylenic unsaturated group and a hydrophilic group include monomers having a carboxyl group, a sulfonic acid group, a hydroxyl group, a phosphoric group, or the like. Specific examples thereof include acrylic acid, methacrylic acid, crotonic acid, itaconic acid, itaconic acid monoester, maleic acid, maleic acid monoester, fumaric acid, fumaric acid monoester, vinyl sulfonic acid, styrene sulfonic acid, sulfonated vinyl naphthalene, vinyl alcohol, acrylamide, methacryloxy ethyl phosphate, bismethacryloxy ethyl phosphate, methacryloxy ethyl phenyl acid phosphate, ethylene glycol dimethacrylate, and diethylene glycol dimethacrylate.

Monomers having an α,β-ethylenic unsaturated group and a hydrophobic group include styrene, styrene derivatives such as α-methyl styrene and vinyltoluene, vinyl cyclohexane, vinyl naphthalene, vinyl naphthalene derivatives, an alkyl acrylate, an alkyl methacrylate, phenyl methacrylate, an cycloalkyl methacrylate, an alkyl crotonate, an dialkyl itaconate, and an dialkyl maleate.

Preferable examples of copolymers used as a polymeric dispersant include a styrene-styrene sulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an alkylacrylate-acrylic acid copolymer, an alkylmethacrylate-methacrylic acid copolymer, a styrene-alkylmethacrylate-methacrylic acid copolymer, a styrene-alkylacrylate-acrylic acid copolymer, a styrene-phenyl methacrylate-methacrylic acid copolymer, and a styrene-cyclohexylmethacrylate-methacrylic acid copolymer. Moreover, monomers having a polyoxyethylene group or a hydroxyl group may be copolymerized with these polymers.

The above polymeric dispersants may have a weight average molecular weight of from 2,000 to 50,000, for example.

These pigment dispersants may be used singly or in combination of two or more kinds. The addition amount of the dispersants may greatly vary depending on the kind of the pigment, but is commonly from 0.1% by weight to 100% by weight with respect to the amount of the pigment.

A self-dispersible pigment that can dissolve in water by itself may also be used as a coloring material. The self-dispersible pigment that can dissolve in water by itself refers to a pigment having many groups that are soluble to water on the surface of the pigment, which can disperse in water without the presence of a polymeric dispersant. Specifically, the self-dispersible pigment can be obtained by subjecting a common pigment to a surface modifying treatment such as an acid/base treatment, a coupling agent treatment, a polymer graft treatment, a plasma treatment, or an oxidation/reduction treatment.

Further, the self-dispersible pigments in water include, other than the pigments that has been subjected to a surface modifying treatment as described above, CAB-O-JET-200, CAB-O-JET-300, IJX-157, IJX-253, IJX-266, IJX-273, IJX-444, IJX-55, CAB-O-JET-250C, CAB-O-JET-260M, CAB-O-JET-270Y and CABOT 260 (trade names; manufactured by Cabot Corporation), and MICROJET BLACK CW-1 and CW-2 (trade names; manufactured by Orient Chemical Industries, Ltd.).

The self-dispersible pigment preferably has at least a sulfonic acid, a sulfonic acid salt, a carboxylic acid or a carboxylic acid salt on the surface of the pigment, as a functional group. The self-dispersible pigment is more preferably a pigment having at least a carboxylic acid or a carboxylic acid salt on the surface of the pigment as a functional group.

Further, pigments covered with a resin may also be used. Such pigments are called a microcapsule pigment and include commercially available microcapsule pigments manufactured by DIC Corporation, Toyo Ink Manufacturing Co., Ltd., or the like, and microcapsule pigments experimentally prepared for the present exemplary embodiment may also be used.

Moreover, resin dispersion-type pigments prepared by physically adsorbing or chemically bonding the aforementioned polymer material to the above pigments may also be used.

The recording materials include dyes such as hydrophilic anionic dyes, direct dyes, cationic dyes, reactive dyes and polymeric dyes, and oil-soluble dyes; wax powder, resin powder or emulsions colored with a dye; fluorescent dyes and fluorescent pigments, infrared absorbing agents, and ultraviolet absorbing agents; magnetic substances, represented by ferromagnetic substances such as ferrite and magnetite; semiconductors or photocatalysts represented by titanium oxide and zinc oxide; and other organic and inorganic electronic material particles.

Among these recording materials, from the viewpoint of effectively preventing diffusion of ink and suppressing ink blurring with the cationic resin contained in the curable material (image recording composition), pigments using an anionic dispersant (for example, the aforementioned anionic surfactant), self-dispersion type pigments having an anionic functional group (for example, sulfonic acid, sulfonic acid salt, carboxylic acid, or carboxylic acid salt, as set forth above), and anionic dyes are most preferable as the recording material.

The content (concentration) of the recording material is, for example, in the range of from 5% by weight to 30% by weight with respect to the amount of the ink.

The volume average particle diameter of the recording material is, for example, in the range of from 10 nm to 1,000 nm.

The volume average particle diameter of the recording material refers to the particle diameter of the recording material particles themselves, or when an additive such as a dispersant is adhered to the recording material particles, refers to the particle diameter of the recording material particles including the additive attached thereto. As a measuring device of the volume average particle diameter, Microtrac UPA particle size distribution analyzer 9340 (trade name; manufactured by Leeds & Northrup) may be used. The measurement is conducted by putting 4 ml of the ink in a measurement cell, and performing measurement in accordance with a predetermined measuring method. As the data to be input upon measurement, the viscosity of the ink is used as the viscosity, and the density of the recording material is used as the density of dispersed particles.

In the following, the water-soluble organic solvents will be explained. The water-soluble organic solvents include polyhydric alcohols, polyhydric alcohol derivatives, nitrogen-containing solvents, alcohols, sulfur-containing solvents, and the like.

Specific examples of the water-soluble organic solvent include polyhydric alcohols such as ethylene glycol, diethylene glycol, propylene glycol, butylene glycol, triethylene glycol, 1,5-pentanediol, 1,2-hexanediol, 1,2,6-hexanetriol, glycerin and trimethylol propane; sugar alcohols such as xylitol; and saccharides such as xylose, glucose, and galactose.

The polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adducts of diglycerol.

The nitrogen-containing solvents include pyrrolidone, N-methyl-2-pyrrolidone, cyclohexyl pyrrolidone and triethanol amine.

The alcohols include alcohols such as ethanol, isopropyl alcohol, butyl alcohol and benzyl alcohol.

The sulfur-containing solvents include thiodiethanol, thiodiglycerol, sulfolane and dimethyl sulfoxide.

The water-soluble organic solvent may also be propylene carbonate and ethylene carbonate.

The water-soluble organic solvent may be used singly or in combination of two or more kinds. The content of the water-soluble organic solvent is, for example, in the range of from 1% by weight to 70% by weight.

In the following, water will be explained. The water is desirably ion exchange water, ultrapure water, distilled water, ultrafiltrated water or the like, in order to prevent the water from being contaminated with impurities.

Next, the other additives will be explained. The other additives that may be used in the ink include a surfactant.

The surfactants include various kinds of anionic surfactants, nonionic surfactants, cationic surfactants and amphoteric surfactants. Among these, anionic surfactants and nonionic surfactants are preferably used.

The surfactant may be used singly or in combination of two or more kinds. Further, in consideration of the solubility, for example, the hydrophilicity-lipophilicity balance (HLB) of the surfactant is in the range of from 3 to 20.

The addition amount of these surfactants may be, for example, in the range of from 0.001% by weight to 5% by weight, and preferably in the range of from 0.01% by weight to 3% by weight.

In addition, the ink may include a penetrant for the purpose of adjusting the permeability of the ink; polyethyleneimine, polyamines, polyvinyl pyrrolidone, polyethylene glycol, ethylcellulose, carboxymethyl cellulose, and the like, for the purpose of controlling characteristics of the ink such as ink-ejection properties; and alkali metal compounds such as potassium hydroxide, sodium hydroxide and lithium hydroxide for the purpose of adjusting the electroconductivity and the pH value of the ink. Further, a pH buffer, an antioxidant, an antifungal agent, a viscosity-controlling agent, an electric conductor, an ultraviolet absorber, a chelating agent, may also be added to the ink, if necessary.

In the following, characteristics of the ink will be explained.

The surface tension of the ink may be, for example, in the range of from 20 mN/m to 45 mN/m.

Here, the value of the surface tension refers to that obtained by using a Wilhelmy surface tensiometer (manufactured by Kyowa Interface Science Co., Ltd.) under the conditions of 23° C. and 55% RH.

The viscosity of the ink may be, for example, in the range of from 1.5 mPa·s to 30 mPa·s.

Here, as the viscosity, a value has been employed which has been measured using TV-20 (manufactured by Toki Sangyo Co., Ltd.) as a measuring apparatus under the conditions of a measurement temperature of 23° C. and a rate of shear of 750 s$^{-1}$.

The ink in the invention is not limited to the above composition. Further, for example, the ink may contain a functional material such as a liquid crystal material and an electronic material, other than the recording material.

Moreover, in each case of the above exemplary embodiments of the invention, a full color image is recorded on a recording medium by selectively ejecting ink droplets of black, yellow, magenta and cyan from respective inkjet recording heads, based on the image data. However, the exemplary embodiments of the invention are not limited to the recording of characters or images onto a recording medium, and are generally applicable to any kind of liquid-ejecting (liquid-jetting) devices for industrial use.

<Second Method>

In the case where a curable material contains a functional group having a polarity opposite to the polarity of a colorant material and/or a dispersant contained in an ink:

When the curable material contained in an image recording composition according to this exemplary embodiment contains a functional group having a polarity opposite to the polarity of a colorant material and/or dispersant contained in an ink, a colorant material in the ink to be ejected to a curable layer formed of the curable material is immobilized.

Although the mechanism is not exactly clear, it is thought to be as follows. When an insoluble salt of the colorant material with the curable material is formed by an ionic reaction between the colorant material and the curable material, the colorant material is immobilized.

Curable Material Containing a Functional Group Having a Polarity Opposite to the Polarity of a Colorant Material and/or a Dispersant Contained in an Ink As the functional group having an opposite polarity contained in the curable material, cationic functional groups are mentioned when a colorant material and/or a dispersant are/is anionic, while when a colorant material and/or a dispersant are/is cationic, anionic functional groups are mentioned. It should be noted that anionic inks are preferable, it is more preferable for the curable material to have a cationic functional group.

Examples of the cationic functional group include amine and salts thereof and ammonium salts. In contrast, examples of anionic functional group include organic acids.

Moreover, the "curing properties" in the curable material according to the second method refer to properties with which the curable material according to the second method is cured by an external stimulus, such as ultraviolet light, an electron beam, or heat, as described in the description of the first method. It should be noted that the stimulus from the outside with which the curable material is cured is not limited thereto, and, for example, moisture, oxygen, etc., can be applied.

Any curable material may be used insofar as the curable material is cured by an external stimulus, such as ultraviolet light, an electron beam, or heat (e.g., cured with the progress of a polymerization reaction). Among the curable materials, a material having a high curing rate (e.g., a material having a high polymerization reaction rate) is preferable considering an increase in an image recording rate. Examples of the curable material include radiation curable materials (e.g., the above-mentioned ultraviolet curable material and the electron beam curable material).

In the curable material according to the second method, specific examples of a precursor having a cationic functional group include cationic curable materials, such as N,N-dialkylamino alkyl acrylate and organic acid salts/halide salts/organic halide salts thereof, N,N-dialkylamino alkyl acrylamide and organic acid salts/halide salts/organic halide salts thereof, amine modified polyester acrylate; amine modified polyurethane acrylate; and vinylpyridine.

More specific examples thereof include an amine modified polyester acrylate oligomer, N,N-dimethylaminopropyl acrylamide, N,N-dialkylaminoalkyl acrylate hydrochloride, N,N-dimethylaminoethyl acrylate methylchloride quaternary salt, vinylpyridine, and pentamethyl piperidyl methacrylate.

In the curable material according to the second method, specific examples of a precursor having an anionic functional group include anionic curable materials, such as β-carboxy ethyl acrylate, carboxylic acid modified polyether acrylate, carboxylic acid modified polyester acrylate, carboxylic acid modified urethane acrylate, and sulfonic acid modified polyester acrylate.

(It should be noted that each specific example mentioned above is a curable material which is cured by irradiation with radiation).

It should be noted that, as the content of a functional group per unit molecular weight in the curable material according to the second method, the number of functional groups is preferably from 1 to 5, more preferably 1 to 4, and particularly preferably from 1 to 3.

The content of a functional group per unit molecular weight in the curable material is a value measured as follows. Numerical values indicated in this specification are measured by the following method. When the molecular structural formula is known, the number of functional groups corresponding to an anionic functional group or a cationic functional group in the structural formula may be simply counted. In contrast, when the molecular structural formula is unknown, the curable material is isolated, the structural formula is determined by chemical analysis, and the number of functional groups corresponding to an anionic functional group or a cationic functional group is calculated.

The curable material may be modified with Si, fluorine, etc.

The content of the curable material in the image recording composition according to the second method can be adjusted in the range of from 50% by weight to 100% by weight, for example.

Examples of a combination of the curable material in the second method and an ink mentioned later include combinations of acrylate having an amine salt structure and an anionic ink, acrylate having a carboxylic acid structure and a cationic ink, acrylate having a sulfonic acid structure and a cationic ink.

Polymerization Initiator

The image recording composition according to the second method may contain a polymerization initiator for progressing a curing reaction by an external stimulus, such as radiation (ultraviolet light, electron beam) or heat, as described in the description of the first method. As specific examples of a polymerization initiator, the polymerization initiators mentioned in the description of the first method are similarly mentioned.

Liquid Absorbing Particles and Another Immobilizing Component

As described above, to the image recording composition according to the second method, liquid absorbing particles are not required to add, or the required addition amount of liquid absorbing particles can be reduced to the minimum. More specifically, it is particularly preferable to contain no liquid absorbing particles from the viewpoint of obtaining a storage stability effect. It should be noted that, to the above-mentioned image recording composition, liquid absorbing particles may be added.

Moreover, the image recording composition according to the second method may contain, in addition to the curable material and liquid absorbing particles, another immobilizing component for immobilizing an ink component on or in a curable layer. It should be noted that it is particularly preferable to contain no another immobilizing component, similarly as in the case of the liquid absorbing particles, from the viewpoint of obtaining a storage stability effect.

As specific examples of the liquid absorbing particles and another immobilizing component, the liquid absorbing particles and another component mentioned in the description of the first method are similarly mentioned.

Ink

Subsequently, an ink to be used in the second method will be described in detail.

In the second method, the inks usable in the first method are used. It should be noted that it is necessary to adjust the polarity of a colorant material and/or a dispersant contained in an ink to a polarity opposite to the polarity of a functional group of the curable material to be used. In particular, when a colorant material and a dispersant are used as a component contained in an ink, the polarity of a dispersant may be adjusted. In contrast, when a pigment which can be self-dispersed in water is used as a colorant material contained in an ink, the polarity of the colorant material may be adjusted.

Examples of a method of adjusting the polarity of a colorant material contained in an ink to an anionic or cationic polarity include a method using a self-dispersing pigment having an anionic or cationic functional group and a method using an anionic dye or a cationic dye.

Here, examples of a self-dispersing pigment having an anionic functional group include CAB-O-JET-200, CAB-O-JET-300, IJX-444, CAB-O-JET-250C, CAB-O-JET-260M, CAB-O-JET-270Y, and CABOT260 manufactured by Cabot Corp., MICROJET BLACK CW-1 and CW-2 manufactured by Orient Chemical Industrial Co., Ltd.

Examples of an anionic dye include C.I. DIRECT BLUE-86, -87, -142, -168, -199, -218, -307,
C.I. DIRECT RED-75, -94, -95, -227,
C.I. DIRECT VIOLET-107,
C.I. DIRECT YELLOW-86, -132, -142, -144,
C.I. ACID BLUE-9, -249, -254,
C.I. ACID RED-198, -249, -289,
C.I. ACID YELLOW-23,
C.I. REACTIVE BLUE-32,
C.I. REACTIVE RED-29, -59,
M-377 manufactured by ILFORD, C.I. FOOD YELLOW-3, Y-104,
C.I. DIRECT BLACK-19, -154, -168, -195, and
C.I. FOOD BLACK-1 and -2.

In contrast, examples of a self-dispersing pigment having a cationic functional group include carbon black in which the pigment surface has been amine modified.

Examples of a cationic dye include rhodamine B and Sudan Black.

As a method of adjusting the polarity of a dispersant contained in an ink to an anionic or cationic polarity include a method using an anionic or cationic dispersant.

Here, as the anionic or cationic dispersant, the anionic surfactants, cationic surfactants, etc., mentioned in the description of the first method are mentioned.

It should be noted that, with respect to an ink to be used for the second method, since the other structures are as described in the description of the first method, the other descriptions are omitted.

<Third Method>

When a Curable Material is Provided with a pH Lower than the pH of an Ink:

When the pH of a curable material contained in an image recording composition according to this exemplary embodiment is lower than the pH of an ink, a colorant material in an ink to be ejected to a curable layer formed of the curable material is immobilized.

Although the mechanism of this effect is not exactly clear, it is thought to be as follows. When an ink permeates into a curable material, the degree of dissociation of a dissociable group contained in the colorant material in the ink decreases due to the pH of the curable material being lower than the pH of the ink. Therefore, it is thought that solubility and dispersion stability of the colorant material decrease and the colorant material aggregates, whereby the colorant material is immobilized.

Curable Material Having a pH Lower than the pH of an Ink:

In the third method, it is essential that the pH of a curable material is lower than the pH of an ink as described above. Moreover, an ink can be used in the range of weak base to weak acidic, and specifically can be used in the range of pH 5 to 9. In contrast, the pH of the curable material can be used in the range of from 3 to 5.

It should be noted that the pH of the curable material and the pH of an ink are values measured as follows. Numerical values indicated in this specification are measured by the following method.

The measurement is performed using a pH/electrical conductivity meter (MPC227, manufactured by Mettler Toledo) under the environment of a temperature of 23±0.5° C. and a humidity of 55±5% RH.

Methods of adjusting the pH of ink will be described later.

Moreover, the "curing properties" in the curable material according to the third method refer to properties with which the curable material is cured by an external stimulus, such as ultraviolet light, an electron beam, or heat, as described in the description of the first method. It should be noted that the stimulus from the outside with which the curable material is cured is not limited thereto, and, for example, moisture, oxygen, etc., can be applied.

Any curable material may be used insofar as the curable material is cured by an external stimulus, such as ultraviolet light, an electron beam, or heat (e.g., cured with the progress of a polymerization reaction). Among the curable materials, a material having a high curing rate (e.g., a material having a high polymerization reaction rate) is preferable considering an increase in an image recording rate. Examples of the curable material include radiation curable materials (e.g., the above-mentioned ultraviolet curable material and the electron beam curable material).

As specific examples of the curable material according to the third method, curable materials having an anionic group, such as half ester of acrylate/methacrylate, acid modified polyester acrylate, acid modified polyurethane acrylate, and acid modified polyether acrylate are preferably used.

More specifically, carboxylic acid modified acrylate, β-carboxy ethyl acrylate, etc., are mentioned.

(It should be noted that each specific example mentioned above is a curable material having properties of being cured by irradiation with radiation).

The curable material may be modified with Si, fluorine, etc.

The content of the curable material in the image recording composition according to the third method is preferably from 50% by weight to 100% by weight, for example.

Examples of a combination of the curable material in the third method and an ink mentioned later include carboxylic acid modified acrylate and a self-dispersing pigment ink containing a carboxylic acid group whose pH has been adjusted in the range of from 6.5 to 7.5; and carboxylic acid modified acrylate and a pigment ink which has been dispersed with a dispersant containing a carboxylic acid group whose pH has been adjusted in the range of from 6.5 to 7.5.

Polymerization Initiator

The image recording composition according to the third method may contain a polymerization initiator for progressing a curing reaction by an external stimulus, such as radiation (ultraviolet light, electron beam) or heat, as described in the description of the first method. As specific examples of a polymerization initiator, the polymerization initiators mentioned in the description of the first method are similarly mentioned.

Liquid Absorbing Particles and Another Immobilizing Component:

As described above, to the image recording composition according to the third method, there is no need to add liquid absorbing particles, or the required addition amount of liquid absorbing particles can be reduced to a minimum. More specifically, it is particularly preferable to contain no liquid absorbing particles from the viewpoint of obtaining a storage stability effect. It should be noted that, to the above-mentioned image recording composition, liquid absorbing particles may be added.

Moreover, the image recording composition according to the third method may contain, in addition to the curable material and liquid absorbing particles, another immobilizing component for immobilizing an ink component on or in a curable layer. It should be noted that it is particularly preferable to contain no another immobilizing component, similarly as in the case of the liquid absorbing particles, from the viewpoint of obtaining a storage stability effect.

As specific examples of the liquid absorbing particles and another component, the liquid absorbing particles and another component mentioned in the description of the first method are similarly mentioned.

Ink

Subsequently, an ink to be used in the third method will be described in detail.

In the third method, the inks usable in the first method are used. It should be noted that it is necessary to adjust the pH of an ink to be higher than the pH of a curable material to be used.

Examples of the method of adjusting the pH of an ink include a method involving adding a pH adjustor, and, specifically, methods involving adding acids, such as hydrochloric acid, sulfuric acid, nitric acid, acetic acid, citric acid, oxalic acid, malonic acid, boric acid, phosphoric acid, phosphorous acid, and lactic acid; bases, such as potassium hydroxide, sodium hydroxide, lithium hydroxide, ammonium hydroxide, triethanolamine, diethanolamine, ethanolamine, 2-amino-2-methyl-1-propanol, and ammonia; and pH buffers, such as phosphate, oxalate, amine salt, and a good buffer.

It should be noted that, with reference to an ink to be used for the third method, since the other structures are as described in the description of the first method, the other descriptions are omitted.

Recording Apparatus

A recording apparatus according to a preferable exemplary embodiment contains: an intermediate transfer member, a supply unit for supplying the image recording composition to the intermediate transfer member, a ejecting unit for ejecting the ink to a curable layer formed of the image recording composition supplied to the intermediate transfer member, a transfer unit for transferring the curable layer, to which the ink has been ejected, from the intermediate transfer member to a recording medium, and a stimulus application unit for applying a stimulus for curing the curable layer.

It should be noted that a measure for heating the intermediate transfer member may be provided.

Moreover, another recording apparatus according to a preferable exemplary embodiment contains: a supply unit for supplying the image recording composition to a recording medium, a ejecting member for ejecting the ink to a curable layer formed of the image recording composition supplied to the recording medium, and a stimulus giving member for giving a stimulus for curing the curable layer.

Subsequently, the recording apparatus according to a preferable exemplary embodiment will be described with reference to the drawings. The same units having the same function are denoted by the same reference numerals throughout the drawings, and the repetitive description thereof may be omitted.

FIG. 1 is a block diagram illustrating a recording apparatus according to a first exemplary embodiment.

As shown in FIG. 1, a recording apparatus 101 according to a first exemplary embodiment includes, for example, an intermediate transfer drum (intermediate transfer member) 10; a supply unit 12 that forms, onto the intermediate transfer drum 10, a curable layer 12B by supplying a curable solution (image recording composition) 12A containing at least a curable material that is cured by an external stimulus (energy); an inkjet recording head 14 that forms an image T by ejecting ink droplets 14A onto the curable layer 12B; a transfer device 16 that transfers the curable layer 12B, on which the image T is formed, onto a recording medium P by positioning the recording medium P on the intermediate transfer drum 10 and applying a pressure thereto; and a stimulus application unit 18 that applies a stimulus by which the curable layer 12B that has been transferred onto the recording medium P is cured.

Further, in the downstream of the transfer device 16 in a direction in which the intermediate transfer drum 10 rotates may be positioned a cleaning unit 20 that removes a residue from the curable layer 12B remaining on the surface of the intermediate transfer drum 10, and other adhesion matters attaching to the intermediate transfer drum 10 such as paper powder from the recording medium P, and the like.

The intermediate transfer drum 10 may have, for example, a cylindrical substrate and a surface layer covering the surface of the cylindrical substrate. The intermediate transfer drum 10 may have a width (the length in an axial direction) that is equal to or wider than the width of the recording medium P.

The materials for the cylindrical substrate include, for example, aluminum, stainless steel (SUS), copper, and the like.

The materials for the surface layer include, for example, various kinds of resins (such as polyimide, polyamideimide, polyester, polyurethane, polyamide, polyether sulfone, and fluorine-based resin), various kinds of rubbers (such as nitrile rubber, ethylene propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber, and fluororubber), and the like. The surface layer may have a single layer structure or a laminated structure.

The supply unit 12 includes, for example, a supply roller 12D that supplies the image recording composition 12A to the intermediate transfer drum 10, and a blade 12E that regulates the thickness of the curable layer 12B formed from the supplied image recording composition 12A, in a housing 12C in which the image recording composition 12A is stored.

The supply roller 12D in the supply unit 12 may be in contact with the intermediate transfer drum 10 in a continuous manner, or may be positioned apart from the intermediate transfer drum 10. Further, the supply unit 12 may supply the image recording composition 12A to the housing 12C from an independent supply system (not shown) so that the image recording composition 12A can be continuously supplied.

Here, as the curable solution 12A, the image recording composition according to the above-mentioned exemplary embodiment is used.

The structure of supply unit 12 is not limited to the above configuration, and may be those utilizing known supplying methods including application methods such as bar coater coating, spray coating, inkjet coating, air-knife coating, blade coating, and roll coating.

The inkjet recording head 14 includes, for example, recording heads for each color including a recording head 14K for ejecting an black ink, a recording head 14C for ejecting a cyan ink, a recording head 14M for ejecting a magenta ink, and a recording head 14Y for ejecting a yellow ink, positioned in this order from the upstream side in a direction in which the intermediate transfer drum 10 rotates. Of course, the structure of the recording head 14 is not limited to the above configuration, and may include only one of the recording heads 14K, 14C, 14M and 14Y.

Each recording head 14 is preferably, for example, a line-type inkjet recording head having a width equal to or wider than the width of a recording medium P, but may be a conventional scan-type inkjet recording head. The method of ejecting ink of each recording head 14 may be any method in which ink can be ejected, such as a piezo-electric element driving method and a heater element driving method.

Each recording head 14 may be arranged, for example, in series in the order of the recording head 14K, the recording head 14C, the recording head 14M and the recording head 14Y from the upstream side in a direction of rotation of the intermediate transfer drum 10.

Each recording head 14 may be arranged in such a manner that the distance between the surface of the intermediate transfer drum 10 and the nozzle surface of the head is, for example, from about 0.3 mm to about 0.7 mm. Further, each recording head 14 is arranged, for example, such that the longitudinal direction thereof intersects with the rotation direction of the intermediate transfer drum 10 (desirably in a perpendicular manner).

The transfer device 16 includes a pressure roll 16A which is arranged so that the pressure roll 16A is pressed against the intermediate transfer drum 10. The pressure roll 16A may be formed from, for example, materials similar to those used for the intermediate transfer drum 10.

A stimulus application unit 18 is selected in accordance with the kind of the curable material contained in the image recording composition 12A. Specifically, for example, when the curable material is a material that is curable upon irradiation with ultraviolet rays, an ultraviolet-ray irradiation unit that irradiates the image recording composition 12A (or the curable layer 12B formed from the image recording composition 12A) with ultraviolet rays is used as the stimulus application unit 18. When the curable material is a material that is curable upon irradiation with electron beams, an electron-beam irradiation unit that irradiates the image recording composition 12A (or the curable layer 12B formed from the image recording composition 12A) with electron beams is used as the stimulus application unit 18. Furthermore, when the material is a material that is curable upon application of heat, a heat application unit that applies heat to the image recording composition 12A (or the curable layer 12B formed from the image recording composition 12A) is used as the stimulus application unit 18.

The ultraviolet-ray irradiation unit may be, for example, a metal halide lamp, a high-pressure mercury lamp, an ultra high-pressure mercury lamp, a deep ultraviolet-ray lamp, a lamp that excites a mercury lamp externally with a microwave ultraviolet laser without using an electrode, a xenon lamp, a UV-LED, and the like.

The conditions for the irradiation with ultraviolet rays are not specifically limited as long as the image recording composition 12A containing a material that is curable upon irradiation with ultraviolet rays (or the curable layer 12B formed from the image recording composition 12A) is fully cured, and may be selected depending on the type of the material that is curable upon irradiation with ultraviolet rays or the thickness of the curable layer 12B formed from the image recording composition 12A, and the like. For example, the irradiation may be conducted with a high-pressure mercury lamp at an output power density of 120 W/cm for 2 s.

The electron-beam irradiation unit may be, for example, a scan-type unit or a curtain-type unit. The curtain-type electron-beam irradiation unit is a device in which thermoelectrons generated at a filament is drawn out by a grid in a vacuum chamber, which are accelerated to form an electron current by a high voltage (for example, 70 kV to 300 kV), and the electron current passes through a window foil to be discharged into the atmosphere. The wavelength of the electron beams is generally shorter than 1 nm, and the energy of the electron beams can be up to several MeVs, but the electron beams having a wavelength in an order of pm and energy of several ten to several hundred keV are normally used.

The conditions for irradiation with the electron beams are not specifically limited as long as the image recording composition 12A (or the curable layer 12B formed from the image recording composition 12A) is fully cured, and may be selected depending on the type of the electron beam-curable material, the thickness of the curable layer 12B, and the like. For example, the irradiation may be conducted with an electron beam quantity of from 5 to 100 kGy levels.

The heat application unit may be, for example, a halogen lamp, a ceramic heater, a Nichrome-wire heater, a microwave heater, an infrared-ray lamp, and the like. A heating device employing an electromagnetic induction method is also applicable.

The conditions for applying heat are not specifically limited as long as the image recording composition 12A containing a material that can be cured by heat (or the curable layer 12B formed by the image recording composition 12A) is fully cured, and may be selected depending on the type of the material that can be cured by heat, the thickness of the curable layer 12B, and the like. For example, the application of heat may be conducted at a temperature of 200° C. for 5 minutes, in the atmosphere.

The above-mentioned state that is "fully cured" refers to a state in which transfer does not occur even when a sheet of paper having permeability (plain paper) is put on the curable layer 12B, which has been cured by the stimulus application unit 18, and a load of 200 g is applied thereon.

The recording medium P may be either permeable medium (for example, plain paper, coat paper and the like) or non-permeable medium (for example, art paper, resin film, and the like). However, the recording medium is not restricted thereto and may be other industrial products, such as a semiconductor substrate.

In the following, an image recording process using the recording apparatus 101 according to the present exemplary embodiment will be explained.

In the recording apparatus 101 according to the present exemplary embodiment, the intermediate transfer drum 10 is driven to rotate, and the image recording composition 12A is supplied onto the surface of the intermediate transfer drum 10 from the supply unit 12 to form a curable layer 12B.

The thickness of the curable layer 12B is not specifically restricted, but may be regulated from 1 μm to 50 μm in the exemplary embodiments.

Further, for example, when the curable layer 12B has a thickness through which ink droplets 14A do not reach the bottom of the layer 12B, the portion in which the ink droplets 14A exist in the curable layer 12B will not be exposed after the transferring of the layer 12B onto the recording medium P, and thus the region in which the ink droplets 14A are absent may serve as a protective layer after being cured.

Next, the ink droplets 14A ejected from the inkjet recording head 14 are applied to the curable layer 12B that has been supplied onto the intermediate transfer drum 10. The inkjet recording head 14 applies the ink droplets 14A to a predetermined position in the curable layer 12B in accordance with the image information.

In this case, the ejection of the ink droplets 14A from the inkjet recording head 14 is performed on the intermediate transfer drum 10 having a rigid body. Therefore, the ejection of the ink droplets 14A is performed on the curable layer 12B in such a state that the surface of the drum is not flexed.

Next, a recording medium P is nipped between the intermediate transfer drum 10 and the transfer device 16, and a pressure is applied to the curable layer 12B to transfer the curable layer 12B on which an image is formed by the ink droplets 14A onto the recording medium P.

Next, the image T formed by the ink droplets 14A is fixed onto the recording medium P by means of a curable resin, by curing the curable layer 12B by applying a stimulus by the stimulus application unit 18. In this way, the curable resin layer (image layer) having the image T formed from the ink droplets 14A is formed on the recording medium P.

Thereafter, residues of the curable layer 12B and adhesive matters remaining on the surface of the intermediate transfer drum 10 from which the curable layer 12B has been transferred to the recording medium P are removed by a cleaning unit 20. The image recording process is repeated by supplying the image recording composition 12A onto the intermediate transfer drum 10 from the supply unit 12 and forming the curable layer 12B.

As described above, image recording is performed in the recording apparatus 101 according to the present exemplary embodiment.

Figure 2:
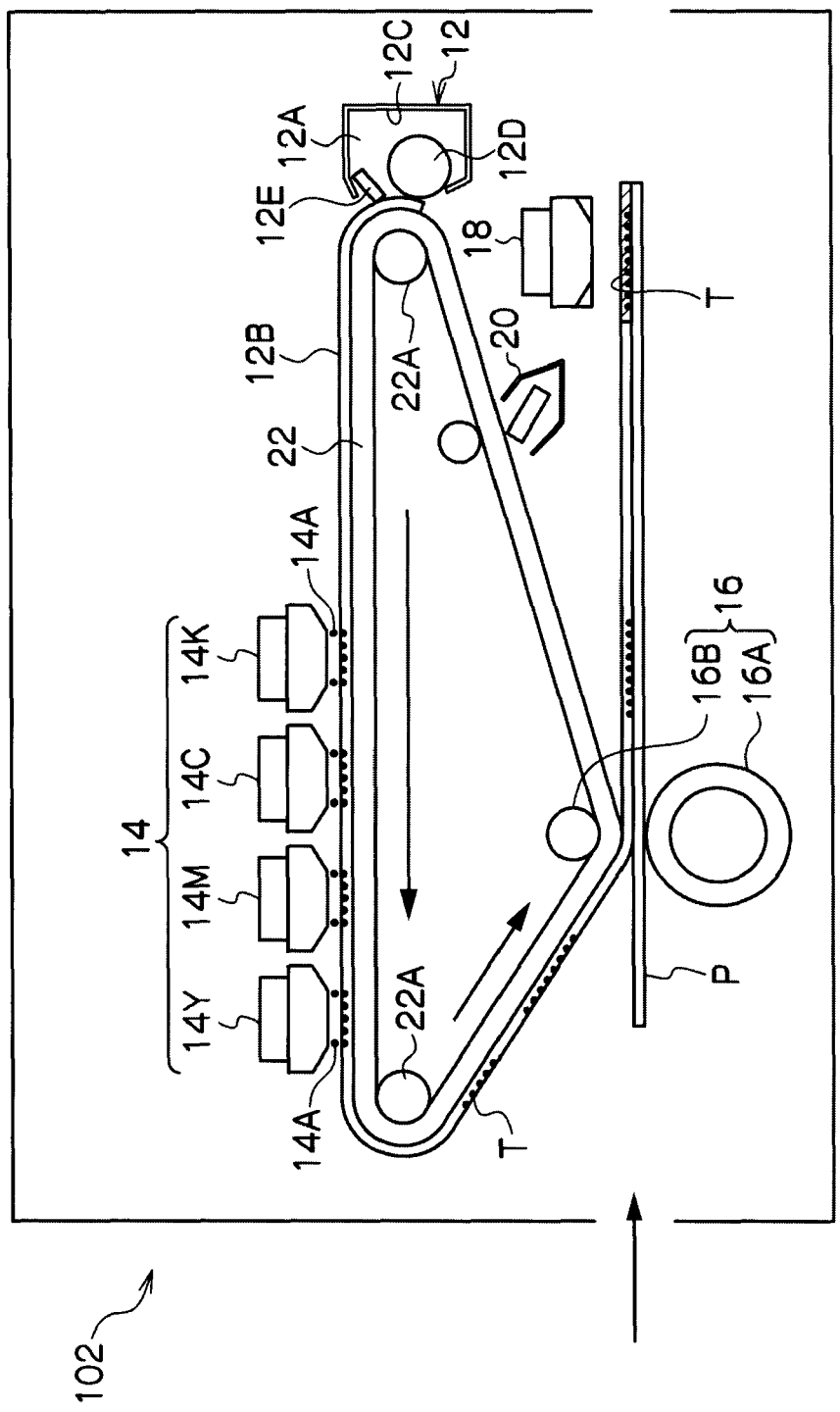
FIG. 2 is a configuration diagram illustrating a recording apparatus according to a second exemplary embodiment.

FIG. 2 is a configurational drawing showing a recording apparatus according to a second exemplary embodiment of the invention.

As shown in FIG. 2, the recording apparatus 102 according to the second exemplary embodiment has an intermediate transfer belt (intermediate transfer member) 22 in place of the intermediate transfer drum 10 in the first exemplary embodiment.

The intermediate transfer belt 22 is, for example, rotatably supported by two support rolls 22A and a pressure roll 16B (transfer device 16) while applying a tension from the inner side of the belt.

The intermediate transfer belt 22 has a width (the length in an axial direction) equal to or wider than the width of the recording medium P. The intermediate transfer belt 22 may be formed from various kinds of resins (such as polyimide, polyamideimide, polyester, polyurethane, polyamide, polyether sulfone, and fluorine-based resins), various kinds of rubbers (such as nitrile rubber, ethylene-propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber and fluororubber), and the like. The intermediate transfer belt 22 may be formed from metallic material such as stainless. The intermediate transfer belt 22 may have a single-layer structure or a laminated structure. The intermediate transfer belt 22 may have a surface layer formed from a releasable material such as a fluorine-based resin or silicone rubber.

Each recording head 14 is positioned above a non-flexed region of the intermediate transfer belt 22, which is rotatably supported and under tension, with a distance between the nozzle face of each recording head and the surface of the intermediate transfer belt 22 being, for example, from about 0.7 mm to about 1.5 mm.

The transfer device 16 includes, for example, a pair of pressure rolls 16A and 16B that are positioned opposite to one another via the intermediate transfer belt 22.

In the recording apparatus 102 according to the present exemplary embodiment, ink droplets 14A are ejected from the inkjet recording head 14 and applied onto the curable layer 12B that has been formed on the intermediate transfer belt 22.

The ejection of the ink droplets 14A from the inkjet recording head 14 is performed at a non-flexed region of the intermediate transfer belt 22 which is under tension and rotatably supported. Therefore, the ink droplets 14A are ejected onto the curable layer 12B when the surface of the belt to which they are ejected is not flexed.

Since matters other than the above are the same as those of the first exemplary embodiment, explanations thereof will be omitted.

Figure 3:
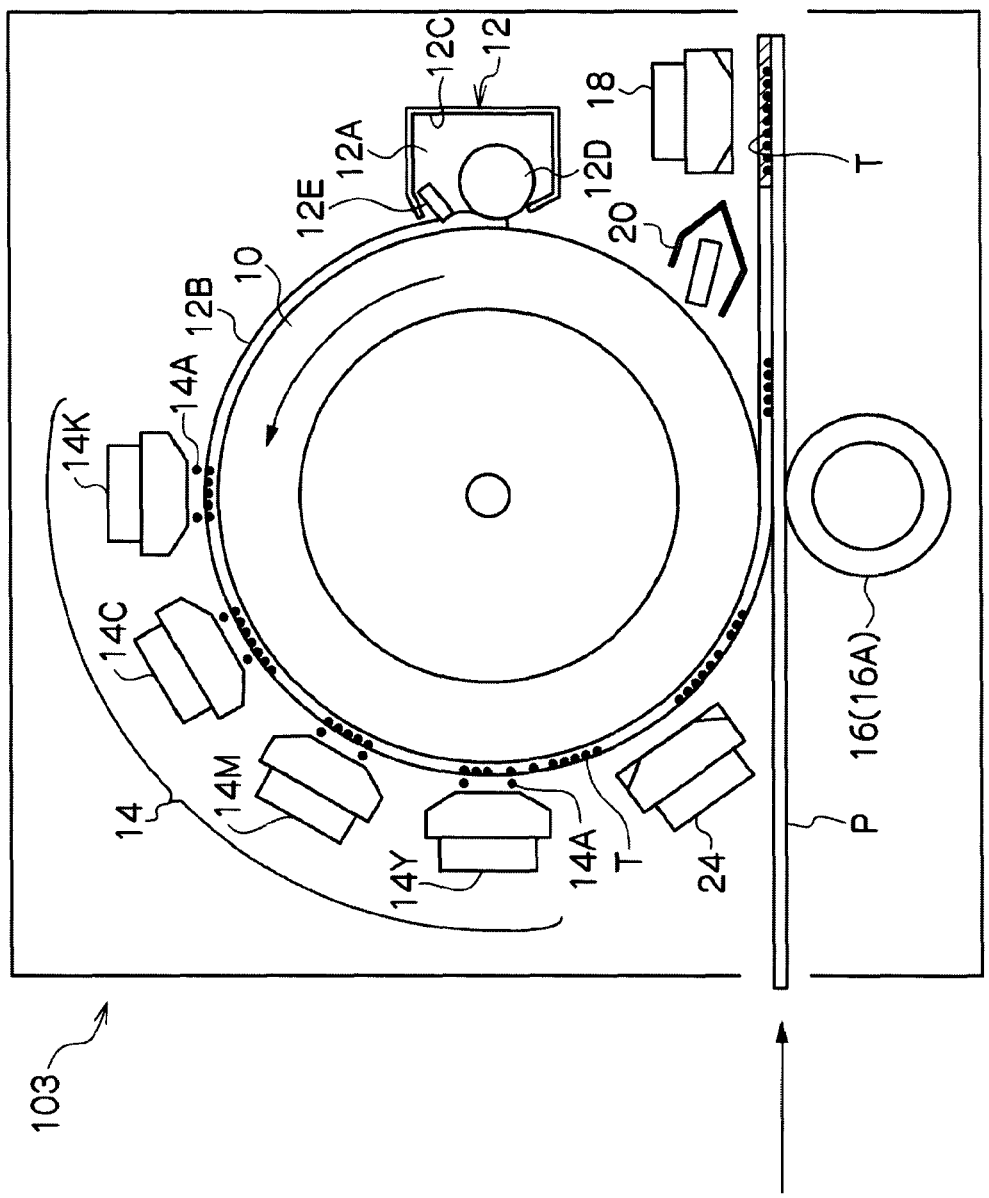
FIG. 3 is a configuration diagram illustrating a recording apparatus according to a third exemplary embodiment.

FIG. 3 is a configurational drawing showing a recording apparatus according to a third exemplary embodiment of the invention.

As shown in FIG. 3, a recording apparatus 103 according to the third exemplary embodiment includes a second stimulus application unit 24, which partially cures the curable layer 12B on which an image is formed from ink droplets 14A before the curable layer 12B is transferred onto a recording medium P.

The second stimulus application unit 24 is arranged, for example, downstream of the inkjet recording head 14 and upstream of the transfer device 16, in a rotation direction of the intermediate transfer belt 22.

The second stimulus application unit 24 may be selected depending on the type of the curable material included in the image recording composition 12A, in a similar manner to the stimulus application unit 18. Specifically, when the curable material is a material that is curable by ultraviolet rays, for example, an ultraviolet-ray irradiation unit that irradiates the image recording composition 12A (or the curable layer 12B formed from the image recording composition 12A) with ultraviolet rays is used as the second stimulus application unit 24. When the curable material is a material that is curable by electron beams, an electron-beam irradiation unit that irradiates the image recording composition 12A (or the curable layer 12B formed from the image recording composition 12A) is used as the second stimulus apply device 24. Further, when the curable material is a material that is curable by heat, a heat application unit that applies heat to the image recording composition 12A (or the curable layer 12B formed from the image recording composition 12A) is used as the second stimulus application unit 24.

The conditions of applying ultraviolet rays, electron beams, or heat by the second stimulus application unit 24 are not specifically restricted, and may be selected depending on the type of the curable material, the thickness of the curable layer and the like, as long as the curable layer 12B on which ink droplets 14A are applied by the inkjet recording head 14 is partially cured when transferred from the intermediate transfer drum 10 to a recording medium P by the transfer device 16.

In this exemplary embodiment, the second stimulus application unit 24 is arranged downstream of the inkjet recording head 14 and upstream of the transfer device 16, but the second stimulus application unit 24 may be arranged upstream of the inkjet recording head 14. When the second stimulus application unit 24 is arranged upstream of the inkjet recording head 14, ink droplets 14A are ejected from the inkjet recording head 14 to the curable layer 12B that has been partially cured to have an increased viscosity. Accordingly, diffusion of the ink droplets 14A in the curable layer 12B is further suppressed, and an image with a higher fineness can be formed.

Here, the state of being "partially cured" refers to a state in which the curable material is not "fully cured", but is cured to some extent, as compared with the curable material in a fully liquid state at the time of being supplied onto the intermediate transfer member. Whether or not the curable material is in a state of being "partially cured" can be determined by the following manner. Namely, when transfer of the curable layer 12B to a sheet of paper having permeability (such as plain paper) put on the curable layer 12B does not occur when no load is applied, but partially occurs with a load of 200 g, it can be determined that the curable layer 12B is partially cured.

In the recording apparatus 103 according to the present exemplary embodiment as described above, the curable layer 12B is partially cured by the second stimulus application unit 24 after the application of the ink droplets 14A ejected from the inkjet recording head 14 onto the curable layer 12B that has been supplied onto the intermediate transfer drum 10, and then the curable layer 12B is transferred onto the recording medium P by the transfer device 16. At the time of the transferring, the curable layer 12B is in a state of being partially cured, namely, having a certain degree of rigidity, and is transferred onto the recording medium P.

Since matters other than the above are the same as those of the first exemplary embodiment, explanations thereof will be omitted.

Figure 4:
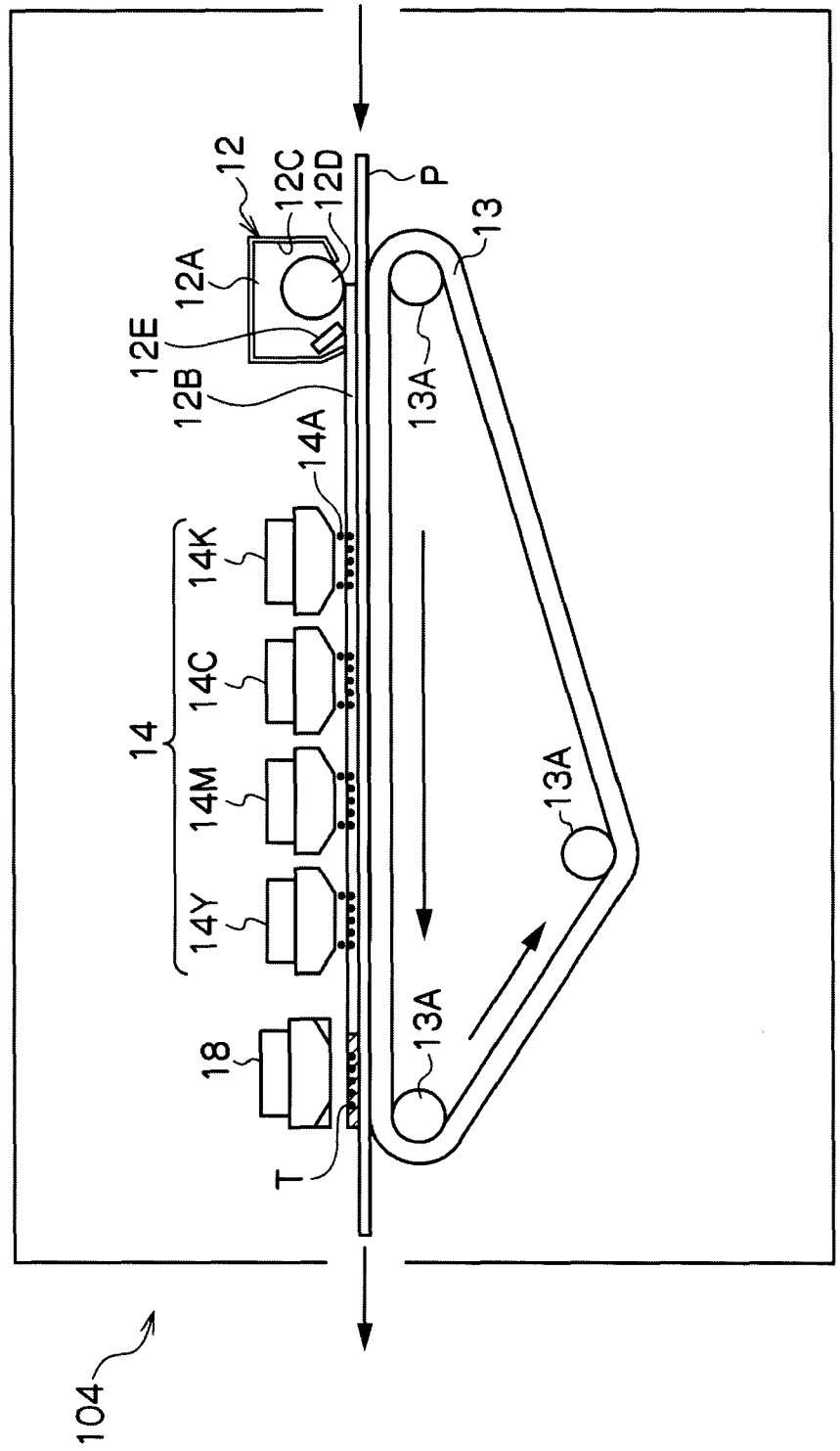
FIG. 4 is a configuration diagram illustrating a recording apparatus according to a fourth exemplary embodiment.

FIG. 4 is a configurational drawing showing a recording apparatus according to a fourth exemplary embodiment of the invention.

As shown in FIG. 4, the recording apparatus 104 according to the fourth exemplary embodiment has a structure in which an image is directly formed on a recording medium P (direct recording system).

The recording apparatus 104 includes, for example, a supply unit 12 that supplies a curable solution (image recording composition) 12A, containing a curable material that is curable upon application of an external stimulus (energy), onto a recording medium P to form a curable layer 12B from the image recording composition 12A; an inkjet recording head 14 that forms an image T by ejecting ink droplets 14A onto the curable layer 12B; and a stimulus application unit 18 that applies a stimulus to cure the curable layer 12B.

Further, the recording apparatus 104 includes a conveyor belt 13 that conveys the recording medium P. The conveyor belt 13 may be, for example, an endless belt similar to the intermediate transfer belt 22 in the second exemplary embodiment. For example, the conveyor belt 13 is rotatably supported by three support rolls 13A while applying a tension from the inner side of the belt. The conveyor belt 13 conveys the recording medium P supplied from a storage container (not shown) and the like, in a direction shown by an arrow by rotating.

In the recording apparatus 104, a curable layer 12B is formed from an image recording composition 12A supplied from a supply unit 12 onto the surface of a recording medium P being conveyed by the conveyor belt 13. Subsequently, ink droplets 14A are ejected from an inkjet recording head 14 in accordance with the image information, and an image T is formed by the ink droplets 14A supplied onto the curable layer 12B formed on the recording medium P. Finally, the curable layer 12B is cured by the stimulus application unit 18, and the curable resin layer (image layer) including the image T formed from the ink droplets 14A is formed on the recording medium P.

Since matters other than the above are the same as those of the first exemplary embodiment, explanations thereof will be omitted.

In the recording apparatuses according to the exemplary embodiments described above, the curable solution (image recording composition) 12A is applied to the intermediate transfer drum 10, the intermediate transfer belt 22, or the recording medium P, to form the curable layer 12B. After the ink droplets 14A are applied to the curable layer 12B to form an image T (in the first to third exemplary embodiments, after further transferring the curable layer 12B to the recording medium P), the curable layer 12B on which the image T is formed is completely cured. At this time, the curable material contained in the curable layer 12B is cured to turn to a "cured resin". Accordingly, an image can be formed on various recording media P, regardless of whether the recording medium P is an impermeable medium or a permeable medium.

In particular, in the recording apparatuses of the first to third exemplary embodiments, employing an intermediate transfer system, the curable layer 12B on the intermediate transfer member (intermediate transfer drum 10 or the intermediate transfer belt 22), on which an image T is formed, is transferred onto the recording medium P. Therefore, for example, when the curable layer 12B has a thickness through which the ink droplets 14A do not reach the bottom of the curable layer 12B, the portion where the ink droplets 14A are present (the portion corresponding to image T) in the curable layer 12B that has been transferred to the recording medium P is not exposed, and the portion where the ink droplets 14 are absent of the curable layer 12B may serve as a protective layer after being cured, thereby enhancing image storability.

On the other hand, in the recording apparatus according to the fourth exemplary embodiment, since a system in which the image recording composition 12A is directly supplied onto the recording medium P (direct-recording system) is employed, the structure of the recording apparatus can be simplified, thereby enabling image formation at high speed and low cost.

EXAMPLES

Hereinafter, the invention will be more specifically described with reference to Examples. However, the invention is not limited to the Examples. It should be noted that, in the following description, "part" is based on a mass unless otherwise specified.

Example 1

Curable Solution

Image Recording Composition

| | |
|---|---|
| Amine modified polyester acrylate oligomer (Cationic curable material according to the second method/ Number of functional groups per unit molecular weight: 2) | 35 parts |
| N,N-dimethylaminopropyl acrylamide (manufactured by KOHJIN Co., Ltd./Cationic curable material according to the second method/Number of functional groups per unit molecular weight: 1) | 65 parts |
| 2-hydroxy-2-methyl-propiophenone (Photopolymerization initiator) | 1 part |

According to the formula above, the listed components are mixed/stirred with a paint shaker to obtain a image recording composition.

—Black Ink—

| | |
|---|---|
| Carbon black (Tradaname: Raven 5750, manufactured by Columbian Chemicals Co.) | 5 parts |
| Anionic pigment dispersant (Tradename: Na-Neutralized Styrene-Butyl acrylate-Acrylic acid polymer, manufactured by BASF A.G./Anionic dispersant according to the second method) | 1 part |
| Polyethylene glycol 200 (manufactured by Wako Pure Chemical Ind. Ltd.) | 20 parts |
| Glycerol | 20 parts |
| Surfynol 465 (manufactured by Nisshin Chemical Industry Co., Ltd.) | 2.0 parts |
| Pure water | 52 parts |

According to the formula above, the listed components are mixed. Further, NaOH is added to adjust the pH, and the mixture is filtered through a 2 μm filter to obtain Black ink.

—Cyan Ink—

| | |
|---|---|
| Copper phthalocyanine pigment (C.I. Pigment blue 15:3) | 4 parts |
| Anionic pigment dispersant (Na-Neutralized Styrene-Methacrylic acid-2-ethylhexyl-Acrylic acid polymer/Anionic dispersant according to the second method) | 0.5 part |
| Diethylene glycol | 30 parts |
| Surfynol 465 (manufactured by Nisshin Chemical Industry Co., Ltd.) | 1.5 parts |
| Pure water | 60 parts |

According to the formula above, the listed components are mixed. Further, NaOH is added to adjust the pH, and the mixture is filtered through a 2-μm filter to obtain Cyan ink.

—Magenta Ink—

| | |
|---|---|
| Quinacridone magenta pigment (C.I. Pigment red 122) | 5 parts |
| Anionic pigment dispersant (Na-Neutralized Styrene-Acrylic acid polymer/Anionic dispersant according to the second method) | 1.0 part |
| Propylene glycol | 10 parts |
| Triethylene glycol monobutyl ether | 20 parts |
| Oxyethylene oleylether | 0.5 part |
| Pure water | 63 parts |

According to the formula above, the listed components are mixed. Further, NaOH is added to adjust the pH, and the mixture is filtered through a 2 μm filter to obtain Magenta ink.

—Yellow Ink—

| | |
|---|---|
| Azo yellow pigment (C.I. Pigment yellow 74) | 4 parts |
| Anionic pigment dispersant (Na-Neutralized Styrene-Methyl methacrylate-Methacrylic acid polymer/Anionic dispersant according to the second method) | 1.5 parts |
| Tetraethylene glycol | 10 parts |
| Glycerol | 15 parts |
| 1,2-hexanediol | 4 parts |
| 2-2-butoxyethoxy ethanol | 5 parts |
| Pure water | 60 parts |

According to the formula above, the listed components are mixed. Further, NaOH is added to adjust the pH, and the mixture is filtered through a 2 μm filter to obtain Yellow ink.

The image recording composition is applied onto a fluorine coated resin belt (intermediate transfer belt) by a gravure coater to form a curable layer having a film thickness of 10 μm. Subsequently, using each of the above-obtained four kinds of inks, printing is performed on the curable layer with a piezo head (resolution of 600 dpi (dpi: dot number per inch)). Thereafter, UV irradiation is performed with a metal halide lamp having an output of 1.5 kW while adhering art paper (Tradename: OK Kinfuji, manufactured by Oji Paper Co., Ltd.) to the resin belt which has a low light absorption in a UV wavelength, whereby the curable layer is transferred to the art paper and fixation by curing is simultaneously performed thereon.

As a result, an image is obtained which has high ink absorption in a curable layer, is free from image blur, and has excellent durability.

When the image recording composition is stored in a dark place where light is blocked, and subsequently a printing operation is performed thereon in the manner described above, the same results as those obtained before storage are obtained.

Comparative Example 1

Printing operation is performed by the method described in Example 1, except using a image recording composition having the following formula in place of the image recording composition of Example 1.

—Image Recording Composition—

| | |
|---|---|
| Polyurethane acrylate (Tradename: Beam set, manufactured by Arakawa Chemical Industries, Ltd./Curable material not having a function of immobilizing a colorant material) | 30 parts |
| 1,6-hexanediol diacrylate (Curable material not having a function of immobilizing a colorant material) | 70 parts |
| 2-hydroxy-2-methyl-propiophenone (Photopolymerization initiator) | 1 part |

According to the formula above, the listed components are mixed/stirred with a paint shaker to obtain a image recording composition.

As a result, the curable layer formed on the intermediate transfer belt repels an ink, resulting in a failure of image formation.

Comparative Example 2

Printing operation is performed by the method described in Example 1, except using a image recording composition having the following formula in place of the image recording composition of Example 1.
—Image Recording Composition—

| | |
|---|---|
| Polyethylene glycol 600 diacrylate (Curable material not having a function of immobilizing a colorant material) | 50 parts |
| Ethylene glycol dimethacrylate (Curable material not having a function of immobilizing a colorant material) | 50 parts |
| 2-hydroxy-2-methyl-propiophenone (Photopolymerization initiator) | 1 part |

According to the above formula, the above components are mixed/stirred with a paint shaker to obtain a image recording composition.

As a result, the colorant material in the ink ejected in the curable layer formed on the intermediate transfer belt moves in the curable layer, and thus only an image having notable blur and distortion is obtained.

Comparative Example 3

Printing operation is performed by the method described in Example 1, except using a image recording composition having the following formula in place of the image recording composition of Example 1.
—Image Recording Composition—

| | |
|---|---|
| Polyurethane acrylate (Tradename: Beam set, manufactured by Arakawa Chemical Industries, Ltd./Curable material not having a function of immobilizing a colorant material)) | 20 parts |
| Polyethylene glycol 600 diacrylate (Curable material not having a function of immobilizing a colorant material) | 50 parts |
| Polyacrylic acid partial sodium salt (Tradename: AQUALIC, manufactured by NIPPON SHOKUBAI CO., LTD./liquid absorbing particles) | 30 parts |
| Polyoxyethylene-polyoxypropylene block copolymer (Dispersant) | 1.5 parts |
| Irgacure 184 (manufactured by Ciba Specialty Chemicals Co., Ltd./Photopolymerization initiator) | 2 parts |

According to the formula above, the listed components are mixed/stirred with a primary mixer to obtain a image recording composition.

As a result, immediately after the above-mentioned image recording composition is prepared, an image free from image blur and having excellent durability is obtained. However, when the image recording composition is stored in a dark place where light is blocked, precipitation and gelling are observed in a part of polyacrylic acid partial sodium salt. Thereafter, when printing operation is performed by the above-described method, the curable layer on the intermediate transfer belt is formed while developing unevenness, liquid absorption decreases, and distortion of an image occurs.

Example 2

Printing operation is performed by the method described in Example 1, except using a image recording composition having the following formula in place of the image recording composition of Example 1.
—Image Recording Composition—

| | |
|---|---|
| N,N-dialkylamino alkyl acrylate hydrochloride (Tradename: DMAEA-Q, manufactured by KOHJIN Co., Ltd./Cationic curable material according to the second method/Number of functional groups per unit molecular weight: 1) | 30 parts |
| Polyurethane acrylate oligomer (Tradename: Ebecryl, manufactured by DAICEL-CYTEC Company LTD./Curable material not having a function of immobilizing a colorant material) | 20 parts |
| Acryloyl morpholine (Tradename: ACMO, manufactured by Kohjin Co., Ltd./Curable material not having a function of immobilizing a colorant material) | 50 parts |
| Irgacure 754 (manufactured by Ciba Specialty Chemicals Co., Ltd./Photopolymerization initiator) | 1 part |

According to the formula above, the listed components are mixed/stirred with a paint shaker to obtain a image recording composition.

As a result, similar to Example 1, an image is obtained which has high ink absorption in a curable layer, is free from image blur, and has excellent durability.

When the image recording composition is stored in a dark place where light is blocked, and subsequently a printing operation is performed thereon in the manner described above, the same results as those obtained before storage are obtained.

Example 3

Image Recording Composition

| | |
|---|---|
| Acid modified acrylate (acid value 150) (Tradename: SB, manufactured by Sartomer Company/Curable material having an anionic group according to the third method/pH 3.5) | 25 parts |

-continued

| | |
|---|---|
| β-carboxy ethyl acrylate (manufactured by DAICEL-CYTEC Company LTD./Curable material having an anionic group according to the third method) | 30 parts |
| Urethane oligomer (Tradename: Ebecryl, manufactured by DAICEL-CYTEC Company LTD./Curable material not having a function of immobilizing a colorant material) | 30 parts |
| Polyethylene glycol 400 diacrylate (Curable material not having a function of immobilizing a colorant material) | 15 parts |
| 2-hydroxy-2-methyl-propiophenone (Photopolymerization initiator) | 1 part |

According to the formula above, the listed components are mixed/stirred with a paint shaker to obtain a image recording composition.

—Black Ink—

| | |
|---|---|
| Self-dispersible carbon black having a carboxylic acid group (Tradename: CAB-O-JET 300 black, manufactured by Cabot Corp./Colorant material according to the third method) | 5 parts |
| Acrylic acid ester-acrylic acid (partial Na salt) copolymer | 2 parts |
| Triethylene glycol | 25 parts |
| Propylene glycol | 15 parts |
| N-methyl-2-pyrrolidone | 15 parts |
| Oxyethylene oxypropylene block copolymer (Tradename: Pluronic, manufactured by BASF A.G.) | 1.0 part |
| Pure water | 40 parts |

According to the formula above, the listed components are mixed. Further, NaOH is added to adjust the pH, and the mixture is filtered through a 2 μm filter to obtain Black ink. The pH of this ink is measured to be 8.0.

—Cyan Ink—

| | |
|---|---|
| Self-dispersible copper phthalocyanine pigment having a carboxylic acid group (Tradename: CAB-O-JET 250C, manufactured by Cabot Corp./Colorant material according to the third method) | 3.5 parts |
| Acrylic acid ester-acrylic acid (partial Na salt) copolymer | 1 part |
| Diethylene glycol | 15 parts |
| Tetraethylene glycol | 20 parts |
| 1,2-pentanediol | 10 parts |
| Pure water | 50 parts |

According to the formula above, the listed components are mixed. Further, NaOH is added to adjust the pH, and the mixture is filtered through a 2 μm filter to obtain Cyan ink. The pH of this ink is measured to be 8.0.

—Magenta Ink—

| | |
|---|---|
| Self-dispersible quinacridone magenta pigment having a carboxylic acid group (Tradename: CAB-O-JET 260M, manufactured by Cabot Corp./Colorant material according to the third method) | 6 parts |
| Acrylic acid ester-acrylic acid (partial Na salt) copolymer | 1.5 parts |
| Dipropylene glycol | 7 parts |
| Glycerol | 15 parts |
| Diethylene glycol monobutyl ether | 10 parts |
| OLFINE E1010 (manufactured by Nisshin Chemical Industries Co., Ltd.) | 0.5 part |
| Pure water | 62 parts |

According to the formula above, the listed components are mixed. Further, NaOH is added to adjust the pH, and the mixture is filtered through a 2 μm filter to obtain Magenta ink. The pH of this ink is measured to be 7.8.

—Yellow Ink—

| | |
|---|---|
| Self-dispersible azo yellow pigment having a carboxylic acid group (Tradename: CAB-O-JET 270Y, manufactured by Cabot Corp./Colorant material according to the third method) | 5 parts |
| Acrylic acid ester-acrylic acid (partial Na salt) copolymer | 2.5 parts |
| Polyethylene glycol 400 (Manufactured by Wako Pure Chemical Ind.) | 10 parts |
| 2-pyrrolidone | 5 parts |
| Triethylene glycol monobutyl ether | 7 parts |
| Oxyethylene stearyl ether | 2 parts |
| Polyether modified dimethylsilicone polymer (manufactured by Shin-Etsu Chemicals Co., Ltd.) | 2 parts |
| Pure water | 66 parts |

According to the formula above, the listed components are mixed. Further, NaOH is added to adjust the pH, and the mixture is filtered through a 2 μm filter to obtain Yellow ink. The pH of this ink is measured to be 7.8.

The image recording composition is applied onto a fluorine coated resin belt (intermediate transfer belt) by a roll coater to form a curable layer having a film thickness of 15 μm. Subsequently, using each of the above-obtained four kinds of inks, printing is performed on the curable layer with a piezo head (resolution of 600 dpi (dpi: dot number per inch)). Thereafter, UV irradiation is performed with a metal halide lamp having an output of 1.5 kW while adhering art paper (Tradename: OK Kinfuji, manufactured by Oji Paper Co., Ltd.) to the resin belt which has a low light absorption in a UV wavelength, whereby the curable layer is transferred to the art paper and fixation by curing is simultaneously performed thereon.

As a result, an image is obtained which has high ink absorption in a curable layer, is free from image blur, and has excellent durability.

When the image recording composition is stored in a dark place where light is blocked, and subsequently a printing operation is performed thereon in the manner described above, the same results as those obtained before storage are obtained.

Example 4

Printing operation is performed by the method described in Example 3, except using a image recording composition having the following formula in place of the image recording composition of Example 3.

—Image Recording Composition—

| | |
|---|---|
| Vinylpyridine (manufactured by Wako Pure Chemical Ind. Ltd./Cationic curable material according to the second method/Number of functional groups per unit molecular weight: 1) | 35 parts |
| Polyurethane acrylate oligomer (Tradename: Ebecryl, manufactured by DAICEL-CYTEC Company LTD./Curable material not having a function of immobilizing a colorant material) | 20 parts |
| Hydroxyethyl acrylamide (Cationic curable material according to the second method/Number of functional groups per unit molecular weight: 1) | 43 parts |

| Irgacure 127 (manufactured by Ciba Specialty Chemicals Co., Ltd./Photopolymerization initiator) | 1.5 parts |
|---|---|

According to the formula above, the listed components are mixed/stirred with a paint shaker to obtain a image recording composition.

As a result, similar to Example 3, an image is obtained which has high ink absorption in a curable layer, is free from image blur, and has excellent durability.

When the image recording composition is stored in a dark place where light is blocked, and subsequently a printing operation is performed thereon in the manner described above, the same results as those obtained before storage are obtained.

Example 5

Image Recording Composition

| | |
|---|---|
| Zinc modified acrylate (manufactured by Sartomer Company/Curable material having an electrolyte structure according to the first method/Number of electrolyte structures per unit molecular weight: 2) | 10 parts |
| Urethane oligomer (Tradename: beam set, manufactured by Arakawa Kagaku Kogyo Co., Ltd./Curable material not having a function of immobilizing a colorant material) | 45 parts |
| Dimethylacrylamide (Cationic curable material according to the second method/Number of functional groups per unit molecular weight: 1) | 45 parts |
| DAROCUR 1173 (manufactured by Ciba Specialty Chemicals Co., Ltd./Photopolymerization initiator) | 2 parts |

According to the formula above, the listed components are mixed/stirred with a paste mixer to obtain a image recording composition.

—Black Ink—

| | |
|---|---|
| Self-dispersible carbon black having a carboxylic acid group (Tradename: CAB-O-JET 300, manufactured by Cabot Corp.) | 5 parts |
| 1,3-butanediol | 10 parts |
| Neopentyl glycol | 10 parts |
| Triethanol propane | 20 parts |
| Surfynol 485 (manufactured by Nisshin Chemical Industry Co., Ltd.) | 1.0 part |
| Surfynol 440 (manufactured by Nisshin Chemical Industry Co., Ltd.) | 1.0 part |
| Pure water | 50 parts |

According to the formula above, the listed components are mixed. Further, NaOH is added to adjust the pH, and the mixture is filtered through a 2 μm filter to obtain Black ink.

—Cyan Ink—

| | |
|---|---|
| Self-dispersible copper phthalocyanine pigment having a carboxylic acid group (Tradename: CAB-O-JET 250C, manufactured by Cabot Corp.) | 4 parts |
| Polyethylene glycol 300 (manufactured by Wako Pure Chemical Ind.) | 15 parts |
| Diethylene glycol | 10 parts |
| Oxyethylene lauryl ether | 1 part |
| Surfynol 465 (manufactured by Nisshin Chemical Industry Co., Ltd.) | 0.5 part |
| Pure water | 70 parts |

According to the formula above, the listed components are mixed. Further, NaOH is added to adjust the pH, and the mixture is filtered through a 2 μm filter to obtain Cyan ink.

—Magenta Ink—

| | |
|---|---|
| Self-dispersible quinacridone magenta pigment having a carboxylic acid group (Tradename: CAB-O-JET 260M, manufactured by Cabot Corp.) | 5 parts |
| Propylene glycol | 5 parts |
| Triethylene glycol | 10 parts |
| 1.2-hexanediol | 10 parts |
| Oxyethylene perfluoro alkyl ether (Tradename: Uni-dyne, manufactured by Daikin Industries) | 0.5 part |
| Pure water | 70 parts |

According to the formula above, the listed components are mixed. Further, NaOH is added to adjust the pH, and the mixture is filtered through a 2 μm filter to obtain Magenta ink.

—Yellow Ink—

| | |
|---|---|
| Self-dispersible azo yellow pigment having a carboxylic acid group (Tradename: CAB-O-JET 270Y, manufactured by Cabot Corp.) | 4 parts |
| Glycerol | 10 parts |
| Diglycerol oxyethylene adduct (manufactured by Sakamoto Yakuhin Co., Ltd.) | 8 parts |
| Oxyethylene-oxypropylene block copolymer (Tradename: NEWPOL, manufactured by Sanyo Chemical Industries, Ltd.) | 1.5 parts |
| Pure water | 70 parts |

According to the formula above, the listed components are mixed. Further, NaOH is added to adjust the pH, and the mixture is filtered through a 2 μm filter to obtain Yellow ink.

The image recording composition is applied onto a fluorine coated resin belt (intermediate transfer belt) by a die coater to form a curable layer having a film thickness of 12 μm. Subsequently, using each of the above-obtained four kinds of inks, printing is performed on the curable layer with a piezo head (resolution of 600 dpi (dpi: dot number per inch)). Thereafter, resin belt and art paper (Tradename: OK Kinfuji, manufactured by Oji Paper Co., Ltd.) is adhered, thereby curable layer is transferred to the art paper. Then UV irradiation is performed with a metal halide lamp having an output of 1.5 kW, thereby cure fixation is performed.

As a result, an image is obtained which has high ink absorption in a curable layer, is free from image blur, and has excellent durability.

When the image recording composition is stored in a dark place where light is blocked, and subsequently a printing operation is performed thereon in the manner described above, the same results as those obtained before storage are obtained.

Example 6

Image Recording Composition

A image recording composition is obtained by the method described in Example 1 according to the formula of Example 1.

—Black Ink—

| | |
|---|---|
| C.I. direct black 154 (anionic) | 4 parts |
| Diethylene glycol | 15 parts |
| Glycerol | 15 parts |
| Surfynol 465 (manufactured by Nisshin Chemical Industry Co., Ltd.) | 2.0 parts |
| Pure water | 65 parts |

According to the formula above, the listed components are mixed. Further, NaOH is added to adjust the pH, and the mixture is filtered through a 0.45 μm filter to obtain Black ink.

—Cyan Ink—

| | |
|---|---|
| C.I. direct blue 199 (anionic) | 3.5 parts |
| Diethylene glycol | 15 parts |
| Glycerol | 15 parts |
| Surfynol 465 (manufactured by Nisshin Chemical Industry Co., Ltd.) | 2.0 parts |
| Pure water | 65 parts |

According to the formula above, the listed components are mixed. Further, NaOH is added to adjust the pH, and the mixture is filtered through a 0.45 μm filter to obtain Cyan ink.

—Magenta Ink—

| | |
|---|---|
| C.I. direct red 70 (anionic) | 3 parts |
| Diethylene glycol | 15 parts |
| Glycerol | 15 parts |
| Surfynol 465 (manufactured by Nisshin Chemical Industry Co., Ltd.) | 2.0 parts |
| Pure water | 65 parts |

According to the formula above, the listed components are mixed. Further, NaOH is added to adjust the pH, and the mixture is filtered through a 0.45 μm filter to obtain Magenta ink.

—Yellow Ink—

| | |
|---|---|
| C.I. direct yellow 132 (anionic) | 3 parts |
| Diethylene glycol | 15 parts |
| Glycerol | 15 parts |
| Surfynol 465 (manufactured by Nisshin Chemical Industry Co., Ltd.) | 2.0 parts |
| Pure water | 65 parts |

According to the formula above, the listed components are mixed. Further, NaOH is added to adjust the pH, and the mixture is filtered through a 0.45-μm filter to obtain Yellow ink.

The image recording composition is applied onto a fluorine coated resin belt (intermediate transfer belt) by a gravure coater to form a curable layer having a film thickness of 10 μm. Subsequently, using each of the above-obtained four kinds of inks, printing is performed on the curable layer with a piezo head (resolution of 600 dpi (dpi: dot number per inch)). Thereafter, UV irradiation is performed with a metal halide lamp having an output of 1.5 kW while adhering art paper (Tradename: OK Kinfuji, manufactured by Oji Paper Co., Ltd.) to the resin belt which has a low light absorption in a UV wavelength, whereby the curable layer is transferred to the art paper and fixation by curing is simultaneously performed thereon.

As a result, ink absorption in the curable layer is high and blur is very slightly detected, which does not cause any problems in the obtained image. Although light fastness is slightly inferior to Example 1, an image excellent in durability is obtained.

When the image recording composition is stored in a dark place where light is blocked, and subsequently a printing operation is performed thereon in the manner described above, the same results as those obtained before storage are obtained.

Example 7

Image Recording Composition

| | |
|---|---|
| Amine modified polyester acrylate oligomer (manufactured by Sartomer Company/Cationic curable material according to the second method/Number of functional group per unit molecular weight: 1) | 55 parts |
| Glycerol propoxy triacrylate (Curable material having no function of immobilizin a colorant material) | 40 parts |
| Irgacure 651 (manufactured by Ciba Specialty Chemicals Co., Ltd./Photopolymerization initiator) | 1.5 parts |

According to the formula above, the listed components are mixed/stirred with a paint shaker to obtain a image recording composition.

As Black ink, Cyan ink, Magenta ink, and Yellow ink, inks according to the formulae of Example 1 are used.

The image recording composition is applied onto a fluorine coated resin belt (intermediate transfer belt) by a gravure coater to form a curable layer having a film thickness of 12 μm. Subsequently, using each of the above-obtained four kinds of inks, printing is performed on the curable layer with a piezo head (resolution of 600 dpi (dpi: dot number per inch)). Thereafter, UV irradiation is performed with a metal halide lamp having an output of 1.5 kW while adhering art paper (Tradename: OK Kinfuji+, manufactured by Oji Paper Co., Ltd.) to the resin belt which has a low light absorption in a UV wavelength, whereby the curable layer is transferred to the art paper and fixation by curing is simultaneously performed thereon.

As a result, permeation of the ink in the curable layer is slow and although image blur is detected, it is not at a level that causes problems in terms of image quality. The durability of the obtained image is also excellent.

When the image recording composition is stored in a dark place where light is blocked, and subsequently a printing operation is performed thereon in the manner described above, the same results as those obtained before storage are obtained.

Example 8

Image Recording Composition

| | |
|---|---|
| N,N-dimethylacrylamide (Curable material not having a function of immobilizing a colorant material) | 15 parts |

| | |
|---|---|
| N,N,-dimethylaminoethyl acrylate methylchloride quaternary salt (manufactured by Kohjin Co., Ltd./Cationic curable material according to the second method/Number of functional groups per unit molecular weight: 8) | 5 parts |
| Polyethylene glycol 600 diacrylate (manufactured by Wako Pure Chemical Ind. Ltd./Curable material not having a function of immobilizing a colorant material) | 5 parts |
| (4-benzoylbenzyl) chloridation trimethylammonium (Photopolymerization initiator) | 0.5 part |
| Pure water | 75 parts |

According to the formula above, the listed components are mixed/stirred to obtain a image recording composition.

As Black ink, Cyan ink, Magenta ink, and Yellow ink, inks according to the formulae of Example 5 are used.

The image recording composition is applied onto a fluorine coated resin belt (intermediate transfer belt) by a gravure coater to form a curable layer having a film thickness of 20 μm. Then, the intermediate transfer belt is heated to volatilize water in the image recording composition. Subsequently, using each of the above-obtained four kinds of inks, printing is performed on the curable layer with a piezo head (resolution of 600 dpi (dpi: dot number per inch)). Thereafter, UV irradiation is performed with a metal halide lamp having an output of 1.5 kW while adhering art paper (Tradename: TOKUHISHI ART, manufactured by MITSUBISHI PAPER MILLS Co., Ltd.) to the resin belt which has a low light absorption in a UV wavelength, whereby the curable layer is transferred to the art paper and fixation by curing is simultaneously performed thereon.

As a result, an image is obtained which has high ink absorption in a curable layer, is free from image blur, and has excellent durability.

When the image recording composition is stored in a dark place where light is blocked, and then printing operation is performed as described above. Then, favorable results, which are not different from the results before storage, are obtained.

Example 9

A method similar to the method described in Example 8 is performed, except using a image recording composition and Black ink, Cyan ink, Magenta ink, and Yellow ink according to the formulae of Example 8 and not heating an intermediate transfer belt.

As a result, ink absorption is high and image blur does not occur, but it takes time for an image to cure and the cured image is slightly poor in durability.

Example 10

Image Recording Composition

| | |
|---|---|
| Acid modified acrylate (acid value 150) (manufactured by Sartomer Company/Curable material having an anionic group according to the third method/pH 3.2) | 25 parts |
| Polyester oligomer (manufactured by DAICEL-CYTEC Company LTD./Curable material not having a function of immobilizing a colorant material) | 20 parts |
| Urethane oligomer (Tradename: beam set, manufactured by Arakawa Kagaku Kogyo Co., Ltd./Curable material not having a function of immobilizing a colorant material) | 30 parts |
| Polyethylene glycol 400 diacrylate (manufactured by Shin-Nakamura Chemical Co., Ltd./Curable material not having a function of immobilizing a colorant material) | 25 parts |
| 2-hydroxy-2-methyl-propiophenone (Photopolymerization initiator) | 1 part |

According to the formula above, the listed components are mixed/stirred with a paint shaker to obtain a image recording composition.

—Black Ink—

| | |
|---|---|
| Self-dispersible carbon black having a carboxylic acid group (Tradename: CAB-O-JET 300, manufactured by Cabot Corp./Colorant material according to the third method) | 5 parts |
| Diethylene glycol | 10 parts |
| N-methyl-2-pyrrolidone | 5 parts |
| Oxyethylene oxypropylene block copolymer (Tradename: NEWPOL, manufactured by Sanyo Chemical Industries, Ltd.) | 1.0 part |
| Pure water | 80 parts |

According to the formula above, the listed components are mixed. Further, NaOH is added to adjust the pH, and the mixture is filtered through a 2 μm filter to obtain Black ink. The pH of this ink is measured to be 8.1.

—Cyan Ink—

| | |
|---|---|
| Self-dispersible copper phthalocyanine pigment having a carboxylic acid group (Tradename: CAB-O-JET 250C, manufactured by Cabot Corp./Colorant material according to the third method) | 4.5 parts |
| Triethylene glycol | 10 parts |
| 1,2-pentanediol | 5 parts |
| Pure water | 80 parts |

According to the formula above, the listed components are mixed. Further, NaOH is added to adjust the pH, and the mixture is filtered through a 2 μm filter to obtain Cyan ink. The pH of this ink is measured to be 7.9.

—Magenta Ink—

| | |
|---|---|
| Self-dispersible quinacridone magenta pigment having a carboxylic acid group (Tradename: CAB-O-JET 260M, manufactured by Cabot Corp./Colorant material according to the third method) | 6 parts |
| Glycerol | 10 parts |
| Polyethylene glycol monobutyl ether | 5 parts |
| OLFINE E1010 (manufactured by Nisshin Chemical Industries Co., Ltd.) | 0.5 part |
| Pure water | 80 parts |

According to the formula above, the listed components are mixed. Further, NaOH is added to adjust the pH, and the mixture is filtered through a 2 μm filter to obtain Magenta ink. The pH of this ink is measured to be 7.7.

—Yellow Ink—

| | |
|---|---|
| Self-dispersible azo yellow pigment having a carboxylic acid group (Tradename: CAB-O-JET 270Y, manufactured by Cabot Corp./Colorant material according to the third method) | 4 parts |
| 2-pyrrolidone | 5 parts |
| Glycerol | 5 parts |
| Oxypropylene oxyethylene block copolymer (Tradename: Pluronic, manufactured by BASF A.G.) | 2 parts |
| Pure water | 85 parts |

According to the formula above, the listed components are mixed. Further, NaOH is added to adjust the pH, and the mixture is filtered through a 2 μm filter to obtain Yellow ink. The pH of this ink is measured to be 7.1.

The image recording composition is applied onto a fluorine coated resin belt (intermediate transfer belt) by a roll coater to form a curable layer having a film thickness of 12 μm. Subsequently, using each of the above-obtained four kinds of inks, printing is performed on the curable layer with a piezo head (resolution of 600 dpi (dpi: dot number per inch)). Thereafter, the intermediate transfer belt is heated to partially volatize a vehicle in the ink. Subsequently, the resin belt and art paper (Tradename: Tokuhishi art, manufactured by Mitsubishi Paper Mill Co., Ltd.) are adhered, and the curable layer is transferred to the art paper. Then, they are cured and fixed on the art paper by performing UV irradiation with a metal halide lamp having an output of 1.5 kW.

As a result, an image is obtained which has high ink absorption in a curable layer, is free from image blur, and has excellent durability.

When the image recording composition is stored in a dark place where light is blocked, and subsequently a printing operation is performed thereon in the manner described above, the same results as those obtained before storage are obtained.

[Evaluation]
—Ink Absorption—

Ink absorption is measured according to the following method.

A 2×2 cm solid patch is printed from an ink jet head, and time until an ink penetrates into a curable layer is measured.
A: Less than 1 second
B: From 1 second to 5 second
C: Exceeding 5 second
—Image Blur—

Image blur is evaluated according to the following method.

A 2×2 cm solid patch is printed, and images after curing are subjected to the following sensory evaluation.
A: The solid outline is straight without distortion.
B: Distortion is slightly observed, which causes no problems in terms of image quality.
C: The outline is sharply distorted and wavy.
—Storage Stability of Image Recording Composition—

A image recording composition is evaluated for storage stability according to the following method.

After the preparation of a image recording composition, the image recording composition is allowed to stand in a dark place where light is blocked for six months. After allowing to stand, evaluation tests for the ink absorption and image blur as described above are carried out, and then the results are evaluated in comparison with the results obtained immediately after the preparation of the image recording composition.
A: No differences are observed in the results between the image recording composition immediately after the preparation and the image recording composition after storing for six months.
B: The image recording composition after storing for six months is deteriorated as compared with the image recording composition immediately after the preparation, which causes no problems.
C: The image recording composition after storing for six months is notably deteriorated as compared with the image recording composition immediately after the preparation, which causes problems.

TABLE 1

| | Ink absorption | Image blur | Storage stability of image recording composition |
|---|---|---|---|
| Example 1 | A | A | A |
| Comparative Example 1 | C | C | — |
| Comparative Example 2 | A | C | A |
| Comparative Example 3 | A | A | C |
| Example 2 | A | A | A |
| Example 3 | A | A | A |
| Example 4 | A | A | A |
| Example 5 | A | A | A |
| Example 6 | A | B | A |
| Example 7 | B | B | A |
| Example 8 | A | A | A |
| Example 9 | A | A | A |
| Example 10 | A | A | A |

What is claimed is:

1. An image recording composition comprising a curable material capable of immobilizing a colorant material in a received ink and curable by an external stimulus, the curable material comprising at least one selected from the group consisting of an amine modified polyester acrylate oligomer, N,N-dimethylaminopropyl acrylamide, N,N-dialkylaminoalkyl acrylate hydrochloride, N,N-dimethylaminoethyl acrylate methylchloride quaternary salt, vinylpyridine, pentamethyl piperidyl methacrylate, hydroxyethyl acrylamide, β-carboxy ethyl acrylate, carboxylic acid modified polyether acrylate, carboxylic acid modified polyester acrylate, carboxylic acid modified urethane acrylate, and sulfonic acid modified polyester acrylate.

2. The image recording composition according to claim 1, wherein the curable material is water soluble.

3. The image recording composition according to claim 1, wherein the curable material has an electrolyte structure.

4. An image recording ink set comprising an ink and separately an image recording composition, the image recording composition including a curable material capable of immobilizing a colorant material in the ink and curable by an external stimulus, the curable material comprising at least one selected from the group consisting of an amine modified polyester acrylate oligomer, N,N-dimethylaminopropyl acrylamide, N,N-dialkylaminoalkyl acrylate hydrochloride, N,N-dimethylaminoethyl acrylate methylchloride quaternary salt, vinylpyridine, pentamethyl piperidyl methacrylate, hydroxyethyl acrylamide, β-carboxy ethyl acrylate, carboxylic acid modified polyether acrylate, carboxylic acid modified polyester acrylate, carboxylic acid modified urethane acrylate, and sulfonic acid modified polyester acrylate.

5. The image recording ink set according to claim 4, wherein the curable material has an electrolyte structure.

6. The image recording ink set according to claim 4, wherein the ink contains a colorant material and the curable material having a functional group, the functional group having a polarity opposite to the polarity of the colorant material.

7. The image recording ink set according to claim 4, wherein the ink contains a colorant material and a dispersant and the curable material having a functional group, the functional group having a polarity opposite to the polarity of the dispersant.

8. The image recording ink set according to claim 4, wherein the pH of the curable material is lower than the pH of the ink.

9. A recording apparatus, comprising:
an intermediate transfer member,
a supply unit that supplies, to the intermediate transfer member, an image recording composition containing a curable material that receives an ink, immobilizes a colorant material in the ink, and that is cured by an external stimulus, the curable material comprising at least one selected from the group consisting of an amine modified polyester acrylate oligomer, N,N-dimethylaminopropyl acrylamide, N,N-dialkylaminoalkyl acrylate hydrochloride, N,N-dimethylaminoethyl acrylate methylchloride quaternary salt, vinylpyridine, pentamethyl piperidyl methacrylate, hydroxyethyl acrylamide, β-carboxy ethyl acrylate, carboxylic acid modified polyether acrylate, carboxylic acid modified polyester acrylate, carboxylic acid modified urethane acrylate, and sulfonic acid modified polyester acrylate,
a ejecting unit that ejects the ink to a curable layer formed by supplying the image recording composition to the intermediate transfer member,
a transfer unit that transfers the curable layer to which the ink has been ejected, from the intermediate transfer member to a recording medium, and
a stimulus application unit that applies a stimulus that cures the curable layer.

10. The recording apparatus according to claim 9 comprising a heating unit that heats the intermediate transfer member.

11. The recording apparatus according to claim 9, wherein the ink contains a colorant material and the curable material having a functional group, the functional group having a polarity opposite to the polarity of the colorant material.

12. The recording apparatus according to claim 9, wherein the ink contains a colorant material and a dispersant and the curable material having a functional group, the functional group having a polarity opposite to the polarity of the dispersant.

13. The recording apparatus according to claim 9, wherein the pH of the curable material is lower than the pH of the ink.

14. A recording apparatus, comprising:
a supply unit that supplies, to a recording medium, an image recording composition containing a curable material that receives an ink, immobilizes a colorant material in the ink, and that is cured by an external stimulus, the curable material comprising at least one selected from the group consisting of an amine modified polyester acrylate oligomer, N,N-dimethylaminopropyl acrylamide, N,N-dialkylaminoalkyl acrylate hydrochloride, N,N-dimethylaminoethyl acrylate methylchloride quaternary salt, vinylpyridine, pentamethyl piperidyl methacrylate, hydroxyethyl acrylamide, β-carboxy ethyl acrylate, carboxylic acid modified polyether acrylate, carboxylic acid modified polyester acrylate, carboxylic acid modified urethane acrylate, and sulfonic acid modified polyester acrylate,
a ejecting unit that ejects the ink to a curable layer formed by supplying the image recording composition to the recording medium, and
a stimulus application unit that applies a stimulus that cures the curable layer.

15. The recording apparatus according to claim 14, wherein the ink contains a colorant material and the curable material having a functional group, the functional group having a polarity opposite to the polarity of the colorant material.

16. The recording apparatus according to claim 14, wherein the ink contains a colorant material and a dispersant and the curable material having a functional group, the functional group having a polarity opposite to the polarity of the dispersant.

17. The recording apparatus according to claim 14, wherein the pH of the curable material is lower than the pH of the ink.

18. An image recording method, comprising:
supplying, to an intermediate transfer member, an image recording composition containing a curable material that receives an ink, immobilizes a colorant material in the ink, and that is cured by an external stimulus, the curable material comprising at least one selected from the group consisting of an amine modified polyester acrylate oligomer, N,N-dimethylaminopropyl acrylamide, N,N-dialkylaminoalkyl acrylate hydrochloride, N,N-dimethylaminoethyl acrylate methylchloride quaternary salt, vinylpyridine, pentamethyl piperidyl methacrylate, hydroxyethyl acrylamide, β-carboxy ethyl acrylate, carboxylic acid modified polyether acrylate, carboxylic acid modified polyester acrylate, carboxylic acid modified urethane acrylate, and sulfonic acid modified polyester acrylate,
ejecting the ink to a curable layer formed by supplying the image recording composition to the intermediate transfer member,
transferring the curable layer to which the ink has been ejected, from the intermediate transfer member to a recording medium, and
applying a stimulus that cures the curable layer.

19. The image recording method according to claim 18, wherein the ink contains a colorant material and the curable material having a functional group, the functional group having a polarity opposite to the polarity of the colorant material.

20. The image recording method according to claim 18, wherein the ink contains a colorant material and a dispersant and the curable material having a functional group, the functional group having a polarity opposite to the polarity of the dispersant.

* * * * *